United States Patent
Chen et al.

(10) Patent No.: US 9,673,952 B2
(45) Date of Patent: Jun. 6, 2017

(54) METHOD AND APPARATUS FOR SUPPORTING USER EQUIPMENTS ON DIFFERENT SYSTEM BANDWIDTHS

(75) Inventors: Wanshi Chen, San Diego, CA (US); Peter Gaal, San Diego, CA (US); Juan Montojo, San Diego, CA (US); Ravi Palanki, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 231 days.

(21) Appl. No.: 12/756,847

(22) Filed: Apr. 8, 2010

(65) Prior Publication Data

US 2011/0085457 A1    Apr. 14, 2011

Related U.S. Application Data

(60) Provisional application No. 61/168,386, filed on Apr. 10, 2009.

(51) Int. Cl.
*H04L 5/00* (2006.01)
*H04L 1/18* (2006.01)
(Continued)

(52) U.S. Cl.
CPC .......... *H04L 5/0053* (2013.01); *H04L 1/1812* (2013.01); *H04L 1/1854* (2013.01);
(Continued)

(58) Field of Classification Search
CPC .......... H04W 72/04–72/044; H04W 72/0453; H04W 72/1278; H04W 72/1289;
(Continued)

(56) References Cited

U.S. PATENT DOCUMENTS 7,991,004 B2   8/2011   Nishio et al.
8,031,583 B2   10/2011  Classon et al.
(Continued)

FOREIGN PATENT DOCUMENTS

CN   101223801 A   7/2008
EP     1838012 A1   9/2007
(Continued)

OTHER PUBLICATIONS

Huawei: "Concept for downlink carrier aggregation in LTE-Advanced" 3GPP Draft; RI-083703, 3rd Generation Partnership Project (3GPP), Mobile Competence Centre ; 650, Route Des Lucioles; F-06921 Sophia-Antipolis Cedex ; France, No. Prague, Czech Republic; 20080924, Sep. 24, 2008 (Sep. 24, 2008), XP050317045 [retrieved on Sep. 24, 2008].
(Continued)

*Primary Examiner* — Pao Sinkantarakorn
(74) *Attorney, Agent, or Firm* — Paul Kuo

(57) ABSTRACT

Techniques for supporting communication for different user equipments (UEs) on different system bandwidths are described. In one design, a base station transmits first control information to support communication for at least one first UE on a first system bandwidth and transmits second control information to support communication for at least one second UE on a second system bandwidth, which overlaps the first system bandwidth. The base station transmits data to the first and second UEs on the first and second system bandwidths, respectively. In one design, the base station receives third control information from the first UE(s) and fourth control information from the second UE(s) on a third system bandwidth. The base station receives data from the first UE(s) on the third system bandwidth and receives data from the second UE(s) on a fourth system bandwidth, which overlaps the third system bandwidth.

67 Claims, 11 Drawing Sheets

(51) Int. Cl.
*H04L 1/00* (2006.01)
*H04W 72/04* (2009.01)

(52) U.S. Cl.
CPC ....... *H04W 72/0453* (2013.01); *H04L 1/0026* (2013.01); *H04L 5/0007* (2013.01); *H04L 2001/0093* (2013.01); *H04W 72/04* (2013.01)

(58) Field of Classification Search
CPC . H04L 5/0037–5/0041; H04L 5/0053–5/0057; H04L 5/0091–5/0094
USPC ........ 370/203–210, 328–338, 436, 437, 465, 370/468; 375/260
See application file for complete search history.

(56) References Cited

U.S. PATENT DOCUMENTS

| | | | |
|---|---|---|---|
| 8,059,735 | B2 | 11/2011 | Shen et al. |
| 8,493,835 | B2 | 7/2013 | Gaal et al. |
| 8,542,605 | B2 | 9/2013 | Chen et al. |
| 8,559,938 | B2 | 10/2013 | Sato et al. |
| 2002/0025818 | A1 | 2/2002 | Kang et al. |
| 2003/0032429 | A1 | 2/2003 | Macridis et al. |
| 2004/0203822 | A1 | 10/2004 | Vitebsky |
| 2006/0007849 | A1 | 1/2006 | Kim et al. |
| 2007/0026813 | A1 | 2/2007 | Khan |
| 2007/0058595 | A1 | 3/2007 | Classon et al. |
| 2007/0280166 | A1 | 12/2007 | Jung et al. |
| 2008/0039098 | A1 | 2/2008 | Papasakellariou et al. |
| 2008/0130519 | A1 | 6/2008 | Bahl et al. |
| 2008/0212556 | A1 | 9/2008 | Heo et al. |
| 2008/0253326 | A1 | 10/2008 | Damnjanovic |
| 2008/0287068 | A1 | 11/2008 | Etemad |
| 2009/0046647 | A1 | 2/2009 | Roh et al. |
| 2009/0196180 | A1 | 8/2009 | Bahl et al. |
| 2009/0257387 | A1 | 10/2009 | Gholmieh et al. |
| 2009/0268831 | A1 | 10/2009 | Onggosanusi et al. |
| 2009/0279480 | A1 | 11/2009 | Rosenqvist et al. |
| 2009/0310476 | A1 | 12/2009 | Seo et al. |
| 2009/0325585 | A1 | 12/2009 | Farajidana et al. |
| 2010/0067410 | A1 | 3/2010 | He et al. |
| 2010/0074205 | A1 | 3/2010 | Papasakellariou et al. |
| 2010/0120424 | A1 | 5/2010 | Johansson et al. |
| 2010/0159939 | A1 | 6/2010 | Jeong et al. |
| 2010/0165931 | A1 | 7/2010 | Nimbalker et al. |
| 2010/0202311 | A1* | 8/2010 | Lunttila ............... H04L 1/0027 370/252 |
| 2010/0246376 | A1* | 9/2010 | Nam et al. .................... 370/208 |
| 2010/0254329 | A1 | 10/2010 | Pan et al. |
| 2010/0281323 | A1 | 11/2010 | Wang et al. |
| 2010/0291937 | A1 | 11/2010 | Hu et al. |
| 2010/0312894 | A1* | 12/2010 | Awad et al. ................... 709/226 |
| 2011/0026495 | A1 | 2/2011 | Lee et al. |
| 2011/0039568 | A1 | 2/2011 | Zhang et al. |
| 2011/0069637 | A1 | 3/2011 | Liu et al. |
| 2011/0081913 | A1 | 4/2011 | Lee et al. |
| 2011/0085508 | A1 | 4/2011 | Wengerter et al. |
| 2011/0086657 | A1* | 4/2011 | Koivisto et al. ............... 455/507 |
| 2011/0090854 | A1 | 4/2011 | Montojo et al. |
| 2011/0103292 | A1 | 5/2011 | Pasad et al. |
| 2011/0151913 | A1* | 6/2011 | Forster et al. ................ 455/509 |
| 2011/0205995 | A1* | 8/2011 | Grovlen ........................ 370/329 |
| 2011/0211538 | A1 | 9/2011 | Kakura |
| 2012/0014330 | A1 | 1/2012 | Damnjanovic et al. |
| 2012/0063413 | A1 | 3/2012 | Kroener et al. |
| 2012/0087331 | A1 | 4/2012 | Seo et al. |
| 2012/0093103 | A1 | 4/2012 | Lee et al. |
| 2012/0106466 | A1 | 5/2012 | Kuusela et al. |
| 2012/0106495 | A1 | 5/2012 | Yang et al. |
| 2012/0122440 | A1 | 5/2012 | Krishnamurthy et al. |
| 2012/0140726 | A1 | 6/2012 | Moon et al. |
| 2012/0147794 | A1 | 6/2012 | Chung et al. |
| 2012/0147846 | A1 | 6/2012 | Ho et al. |
| 2013/0034062 | A1 | 2/2013 | Seo et al. |

FOREIGN PATENT DOCUMENTS

| | | |
|---|---|---|
| EP | 2106057 A1 | 9/2009 |
| JP | 2006173809 A | 6/2006 |
| WO | 2008151228 A2 | 12/2008 |
| WO | 2009061257 A1 | 5/2009 |
| WO | WO2010061717 | 6/2010 |
| WO | 2011047355 A2 | 4/2011 |
| WO | 2011047357 A1 | 4/2011 |

OTHER PUBLICATIONS

Huawei: "PUCCH design for carrier aggregation" 3GPP Draft; R1-091275, 3rd Generation Partnership Project (3GPP), Mobile Competence Centre ; 650, Route Des Lucioles ; F-06921 Sophia-Antipolis Cedex ; France, No. Seoul, Korea; 20090317, Mar. 17, 2009 (Mar. 17, 2009) , XP050338883 [retrieved on Mar. 17, 2009].
International Search Report and Written Opinion—PCT/US2010/031476, International Search Authority—European Patent Office Jul. 23, 2010.
QUALCOMM Europe: "Multicarrier Control for LTE-Advanced" 3GPP Draft; R1-091460, 3rd Generation Partnership Project (SGPP), Mobile Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050339027.
Taiwan Search Report—TW099111154—TIPO—May 13, 2013.
International Search Report and Written Opinion—PCT/US2010/030623, International Search Authority—European Patent Office Jul. 23, 2010.
3GPP TS 36.211: "3rd Generation Partnership Project; Technical Specification Group Radio Access Network; Evolved Universal Terrestrial Radio Access (E-UTRA); Physical Channels and Modulation," Release 9, V9.0.0, Dec. 2009, pp. 1-85.
Fujitsu: "Anchor component carrier and preferred control signal structure," 3GPP Draft; R1-091503, SRD Generation Partnership Project (3GPP), Mobile Competence Centre ; 650, Route Des Lucioles ; F-06921 Sophia-Antipolis Cedex ; France, No. Seoul, Korea; 20090318, Mar. 18, 2009 (Mar. 18, 2009), pp. 5, XP050339062.
Huawei: Component carrier structures, 3GPP TSG RAN WG1 Meeting #57 contribution, [online] 3GPP, R1-091809, pp. 1-3, (May 9, 2014), URL: http://www.3gpp.org/ftp/tsg_ran/WG1_RL1/TSGR1_57/Docs/R1-091809.zip.
QUALCOMM Europe, "Notion of Anchor Carrier in LTE-A", 3GPP TSG RAN WG1 #56bis R1-091458, Mar. 23, 2009, pp. 1-5.
QUALCOMM Europe: "Support of Rel-8 UEs by LTE-A Relays", 3GPP RAN WG1#54bis, R1-084054, Oct. 3, 2008.
QUALCOMM Europe,"Notions of segment and backwards/non-backwards compatible carriers",3GPP TSG RAN WG1 #57bis, R1-092704,Jul. 2009,pp. 1-2, URL: http://www.3gpp.org/ftp/tsg_ran/wg1_rl1/TSGR1_57b/Docs/R1-092704.zip.
ZTE: "Uplink Control Channel Design for LTE-Advanced", 3GPP Draft; R1-091427 Uplink Control Channel Design for LTE-A, 3rd Generation Partnership Project (3GPP), Mobile Competence Centre; 650, Route Des Lucioles; F-06921 Sophia-Antipolis Cedex; France, No. Seoul, Korea; 20090317, Mar. 17, 2009 (Mar. 17, 2009), XP050339006.

* cited by examiner

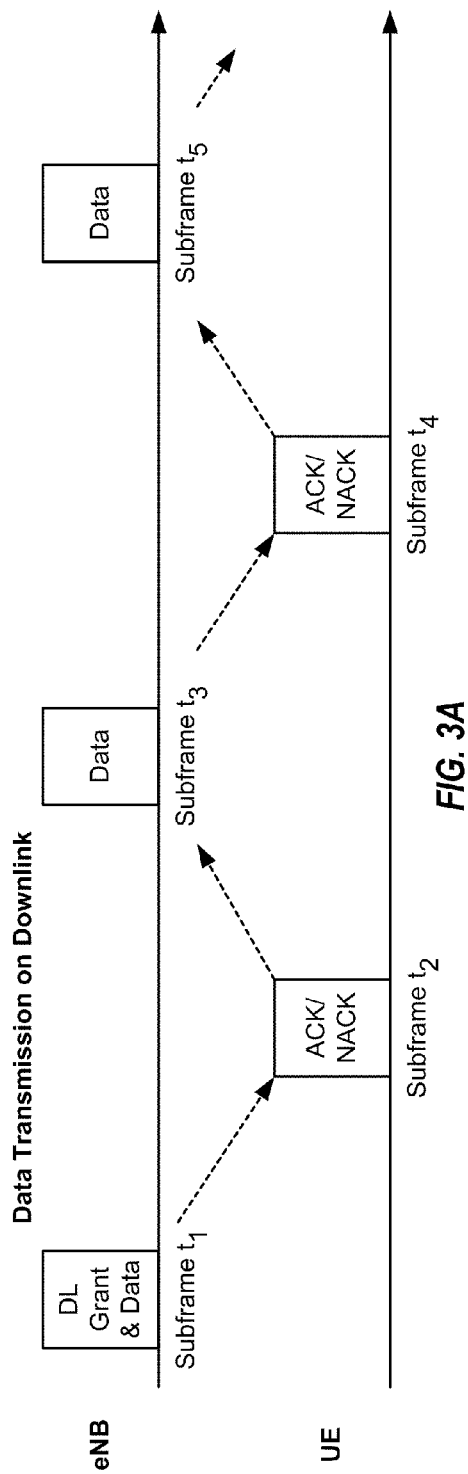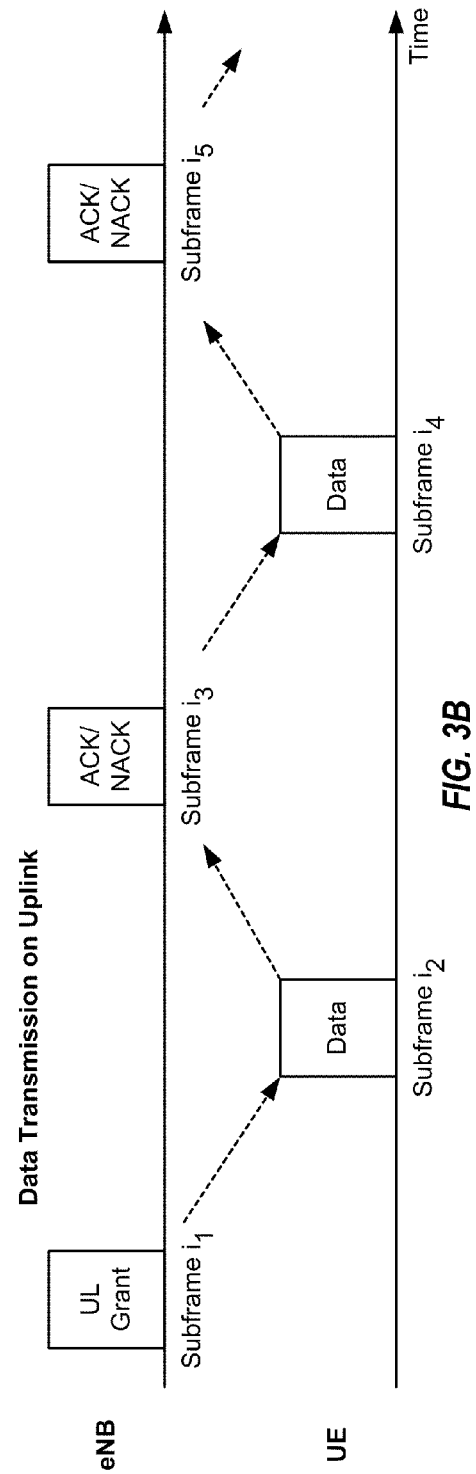

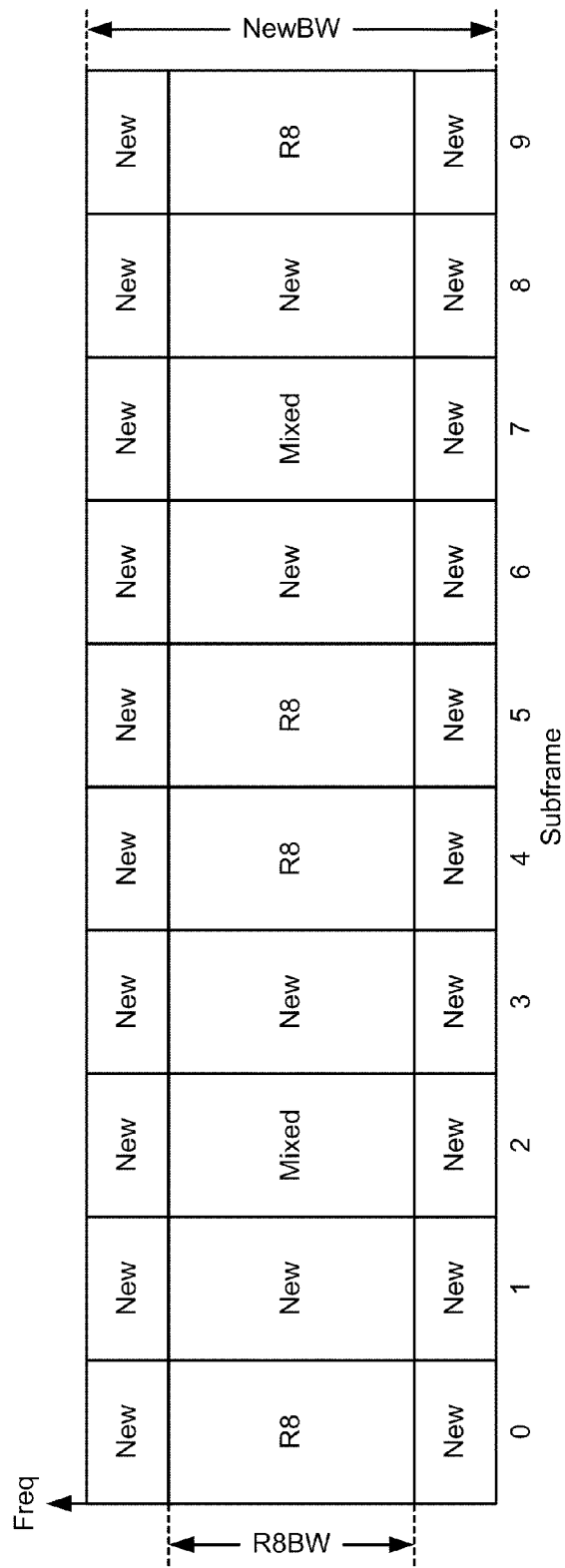

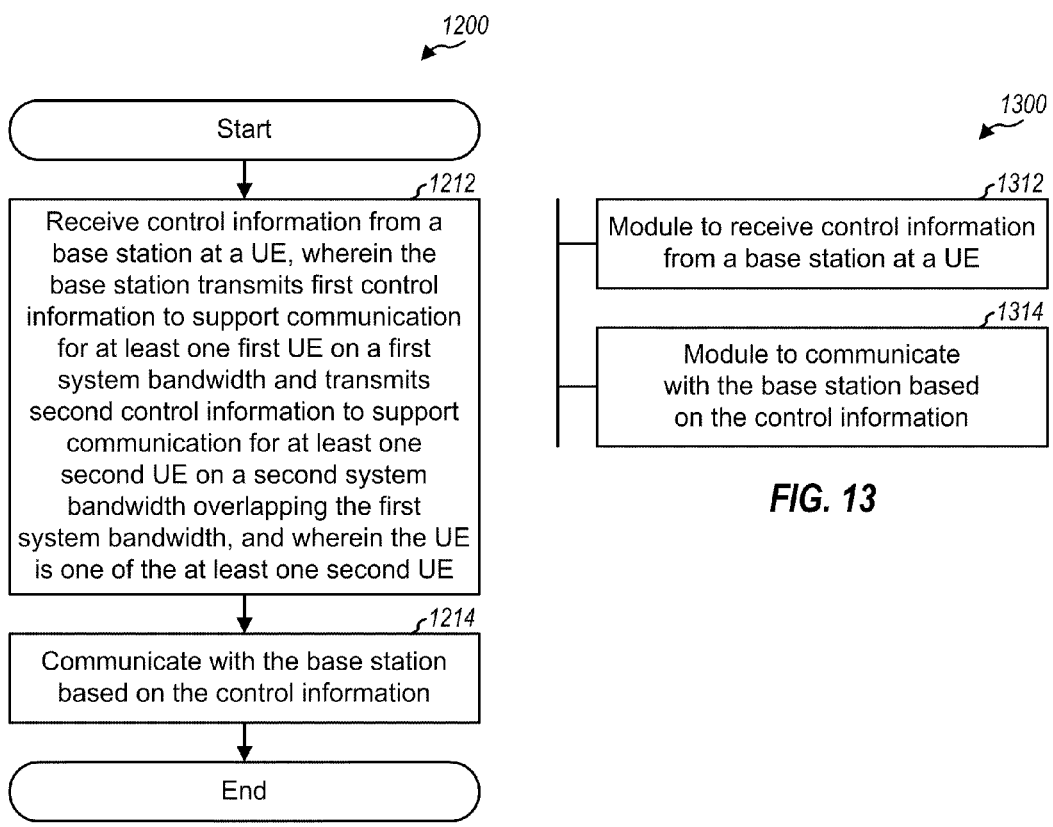

METHOD AND APPARATUS FOR SUPPORTING USER EQUIPMENTS ON DIFFERENT SYSTEM BANDWIDTHS

The present application claims priority to provisional U.S. Application Ser. No. 61/168,386, entitled "A METHOD AND APPARATUS FOR EFFICIENT USE OF BANDWIDTH FOR USER EQUIPMENT OPERATING IN SYSTEMS WITH DIFFERENT BANDWIDTHS," filed Apr. 10, 2009, assigned to the assignee hereof and incorporated herein by reference.

BACKGROUND

I. Field

The present disclosure relates generally to communication, and more specifically to techniques for supporting communication in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The wireless system may operate with a configurable system bandwidth, which may be selected from a set of system bandwidths supported by the system. It may be desirable to efficiently support communication for UEs in such a system.

SUMMARY

Techniques for supporting communication for different UEs on different system bandwidths are described herein. In one design, a base station may transmit first control information to support communication for at least one first UE on a first system bandwidth. The base station may transmit second control information to support communication for at least one second UE on a second system bandwidth, which may overlap the first system bandwidth. The base station may transmit data to the first UE(s) on the first system bandwidth and may transmit data to the second UE(s) on the second system bandwidth. In one design, the base station may transmit the second control information on the first system bandwidth and may transmit data to the second UE(s) on the second system bandwidth. The second UE(s) may then have different system bandwidths for control information and data. The base station may transmit control information and data to the first and second UEs in various manners, as described below. The base station may also transmit overhead signals to support communication for the first and second UEs, as also described below.

In one design, the base station may receive third control information from the first UE(s) on a third system bandwidth and may receive fourth control information from the second UE(s) on the third system bandwidth. The base station may receive data from the first UE(s) on the third system bandwidth and may receive data from the second UE(s) on a fourth system bandwidth, which may overlap the third system bandwidth. The second UE(s) may transmit control information and data in various manners, as described below.

Various aspects and features of the disclosure are described in further detail below.

BRIEF DESCRIPTION OF THE DRAWINGS

FIGS. 3A and 3B show data transmission on downlink and uplink, respectively.
FIG. 5 shows multiplexing of the first and second UEs in different subframes.
FIG. 6 shows multiplexing of the first and second UEs in different subframes and on different parts of the overall system bandwidth.
FIG. 12 shows a process for communicating by a UE.
FIG. 13 shows an apparatus for communicating by a UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
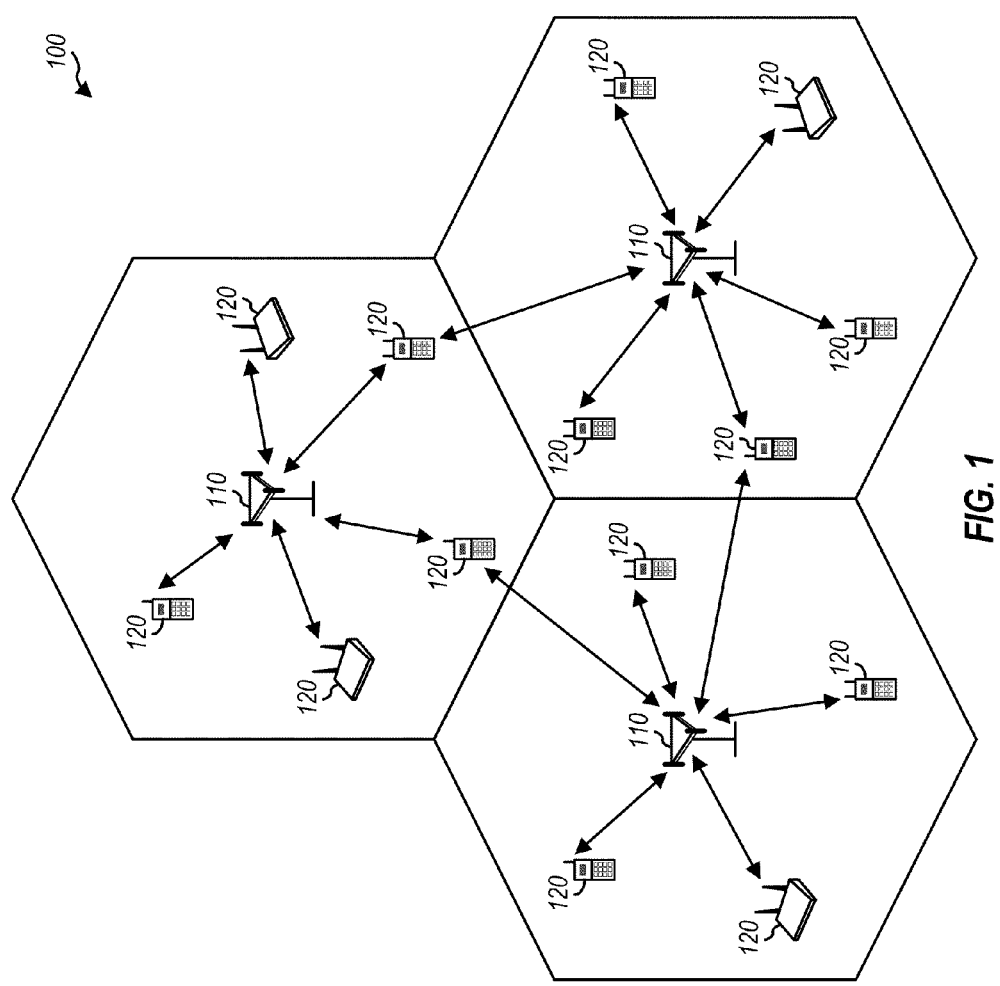
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with UEs and may also be referred to as a base station, a Node B, an access point, etc. Each eNB 110 may provide communication coverage for a particular geographic area and may support communication for UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The system may utilize frequency division duplexing (FDD) or time division duplexing (TDD). For FDD, the downlink and uplink are allocated separate frequency channels. Downlink transmissions and uplink transmissions may be sent concurrently on the two frequency channels. For TDD, the downlink and uplink share the same frequency channel. Downlink and uplink transmissions may be sent on the same frequency channel in different time intervals.

Figure 2:
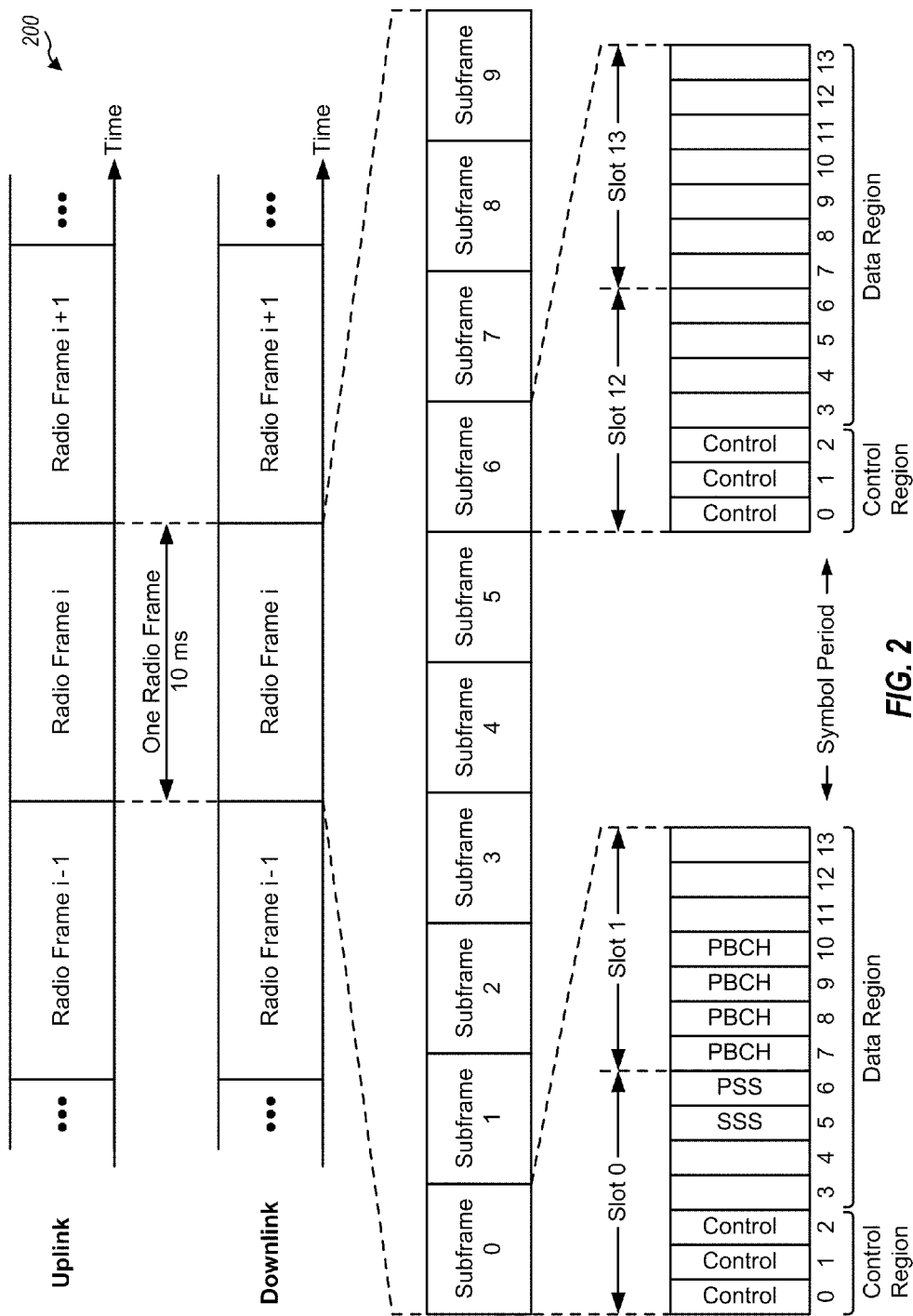
FIG. 2 shows an exemplary frame structure.

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1. On the downlink, an OFDM symbol may be transmitted in each symbol period of a subframe. On the uplink, an SC-FDMA symbol may be transmitted in each symbol period of a subframe.

The system may support hybrid automatic repeat request (HARQ) for data transmission on the downlink and uplink. For HARQ, a transmitter may send one or more transmissions of a transport block (or packet) until the transport block is decoded correctly by a receiver or some other termination condition is encountered.

FIG. 3A shows data transmission on the downlink with HARQ. An eNB may have data to send to a UE and may schedule the UE for data transmission on the downlink. The eNB may send a downlink (DL) grant and data to the UE in subframe $t_1$. The downlink grant may convey the assigned downlink resources, the selected modulation and coding scheme (MCS), etc. The UE may receive the downlink grant and data transmission from the eNB and may process the data transmission in accordance with the downlink grant. Depending on the decoding result, the UE may send an acknowledgement (ACK) or a negative acknowledgement (NAK) in subframe $t_2$. The eNB may retransmit the data in subframe $t_3$ if a NAK is received and may transmit new data if an ACK is received. Data transmission by the eNB and ACK/NAK feedback by the UE may continue in similar manner.

FIG. 3B shows data transmission on the uplink with HARQ. A UE may have data to transmit and may send a scheduling request to an eNB (not shown in FIG. 3B). The UE may be scheduled for data transmission on the uplink. The eNB may send an uplink (UL) grant to the UE in subframe $i_1$. The uplink grant may convey the assigned uplink resources, the selected MCS, etc. The UE may transmit data on the assigned uplink resources to the eNB in subframe $i_2$. The eNB may receive and process the data transmission from the UE. Depending on the decoding result, the eNB may send either an ACK or a NAK in subframe $i_3$. The UE may retransmit the data in subframe $i_4$ if a NAK is received and may transmit new data if an ACK is received. Data transmission by the UE and ACK/NAK feedback by the eNB may continue in similar manner.

LTE supports synchronous HARQ on the uplink and asynchronous HARQ on the downlink. For synchronous HARQ, all transmissions of a transport block may be sent in subframes of a single HARQ interlace. S HARQ interlaces may be defined for each link, and each HARQ interlace may include every S-th subframe for that link, where S may be equal to 4, 6, 8, etc. For asynchronous HARQ, each transmission of a transport block may be scheduled and sent in any subframe. For both synchronous and asynchronous HARQ, a receiver may receive data in a particular subframe and may send ACK/NACK information Q subframes later, where Q may be equal to 2, 4, etc. For example, $t_2=t_1+Q$ and $t_4=t_3+Q$ in FIG. 3A, and $i_3=i_2+Q$ in FIG. 3B.

An eNB may transmit various overhead channels and signals on the downlink to support communication for UEs. The overhead channels may include (i) broadcast channels carrying system information and (ii) control channels carrying control information. The overhead signals may include synchronization signals used for system acquisition, reference signals used for channel quality measurements and channel estimation, and/or other signals. Referring back to FIG. 2, the eNB may transmit a primary synchronization signal (PSS) and a secondary synchronization signal (SSS) in the center 1.08 MHz of the system bandwidth for each cell in the eNB. The PSS and SSS may be transmitted in symbol periods 6 and 5, respectively, in subframes 0 and 5 of each radio frame with the normal cyclic prefix. The PSS and SSS may be used by UEs for cell search and acquisition. The eNB may transmit a Physical Broadcast Channel (PBCH) in symbol periods 0 to 3 in slot 1 of subframe 0 in certain radio frames. The PBCH may carry some system information.

Each subframe for the downlink may include a control region and a data region, which may be time division multiplexed (TDMed) as shown in FIG. 2. The control region may include the first M symbol periods of the subframe, where M may be equal to 1, 2, 3 or 4 and may change from subframe to subframe. The control region may carry control information for UEs. The data region may include the remaining 2L-M symbol periods of the subframe and may carry traffic data and/or other information for UEs.

An eNB may transmit various control channels such as a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region (i.e., the M value). The PHICH may carry ACK/NACK information for data transmission sent on the uplink with HARQ. The PDCCH may carry downlink control information (DCI) for UEs. The DCI may comprise downlink grants, uplink grants, power control information, etc. The eNB may transmit a Physical Downlink Shared Channel (PDSCH) in the data region of a subframe. The PDSCH may carry traffic data for UEs scheduled for data transmission on the downlink.

Each subframe for the uplink may include a control region and a data region, which may be frequency division multiplexed (FDMed). The control section may be formed at the two edges of the system bandwidth and may have a configurable size, which may be selected based on the amount of control information being sent on the uplink by UEs. The data section may include the remaining frequency not included in the control section.

A UE may transmit either a Physical Uplink Control Channel (PUCCH) in the control region or a Physical Uplink Shared Channel (PUSCH) in the data region of a subframe. The PUCCH may carry control information such as ACK/NACK information for data transmission sent on the downlink, channel quality indicator (CQI) information, scheduling request, etc. The PUSCH may carry only data or both data and control information from the UE.

The various channels and signals in LTE are described in 3GPP TS 36.211, entitled "Evolved Universal Terrestrial Radio Access (E-UTRA); Physical Channels and Modulation," which is publicly available.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively.

The available time frequency resources for each link may be partitioned into resource blocks. Each resource block may cover 12 subcarriers in one slot. The number of resource blocks in each slot may be dependent on the system bandwidth and may range from 6 to 110 for system bandwidth of 1.25 to 20 MHz, respectively. Each resource block may include a number of resource elements. Each resource element may cover one subcarrier in one symbol period and may be used to transmit one modulation symbol, which may be a real or complex value.

The system may support different system bandwidths for different UEs on the downlink and uplink. In one design, for the downlink, the system may support (i) a first system bandwidth denoted as R8BW for legacy/first UEs and (ii) a second system bandwidth denoted as NewBW for new/second UEs. In one design, for the uplink, the system may support (i) a third system bandwidth denoted as R8BWUL for the legacy UEs and (ii) a fourth system bandwidth denoted as NewBWUL for the new UEs. As an example, a legacy UE may support LTE Release 8 or 9 or some other release, and a new UE may support a later LTE release. The second system bandwidth may completely or partially overlap the first system bandwidth. Similarly, the fourth system bandwidth may completely or partially overlap the third system bandwidth.

The different system bandwidths for each link may be conveyed to UEs in various manners. In one design, the first and second system bandwidths for the downlink may be conveyed by a 3-bit R8BW value and a 2-bit NewBW value sent in a master information block (MIB). In one design, the third and fourth system bandwidths for the uplink may be conveyed by a 3-bit R8BWUL value and a 2-bit NewBWUL value sent in a system information block type 2 (SIB2). Each eNB may periodically broadcast the MIB and SIB2 to UEs.

Table 1 shows interpretation of R8BW and NewBW values by the legacy and new UEs to determine the first and second system bandwidths for the downlink, in accordance with one design.

TABLE 1

System Bandwidth Information

| R8BW Value | NewBW Value | Legacy UE Interpretation | New UE Interpretation |
|---|---|---|---|
| 000-101 | 00 | BW = R8BW | BW = R8BW |
|  | 01 | BW = R8BW | BW = NewBW1 |
|  | 10 | BW = R8BW | BW = NewBW2 |
|  | 11 | BW = R8BW | BW = NewBW3 |
| 110-111 | Ignored | Reserved | Reserved |

LTE Releases 8 and 9 support a set of six system bandwidths for the downlink, which are assigned six R8BW values of 000 through 101 (binary), as shown in Table 2. The two remaining R8BW values of 110 and 111 (binary) are reserved and not used. Three additional sets of six system bandwidths may be defined, and these three additional sets may be assigned NewBW values of 01, 10 and 11, as shown in Table 1. The six system bandwidths in each additional set may be assigned R8BW values of 000 through 101 (binary).

TABLE 2

R8BW Bandwidth

| R8BW Value | R8BW Bandwidth | Number of Resource Blocks | R8BW Value | R8BW Bandwidth | Number of Resource Blocks |
|---|---|---|---|---|---|
| 000 | 1.4 MHz | 6 | 100 | 15 MHz | 75 |
| 001 | 3 MHz | 15 | 101 | 20 MHz | 100 |
| 010 | 5 MHz | 25 | 110 | Reserved | Reserved |
| 011 | 10 MHz | 50 | 111 | Reserved | Reserved |

A legacy UE may receive the R8BW value from the MIB and can determine the first system bandwidth (R8BW) applicable for the legacy UE based on the R8BW value, as shown in Table 2. A new UE may receive the R8BW value and the NewBW value from the MIB and can determine which additional set of system bandwidths to use based on the NewBW value. The new UE can then determine the second system bandwidth (NewBW) applicable for the new UE based on the system bandwidth corresponding to the R8BW value in this additional set of system bandwidths. The NewBW bandwidth may thus be equal to NewBW1, NewBW2 or NewBW3 depending on the NewBW value.

Tables 1 and 2 show an exemplary design of conveying the first and second system bandwidths for the downlink to the legacy and new UEs. The first and second system bandwidths for the downlink may also be conveyed in other manners.

R8BWUL values and NewBWUL values for the uplink may be defined and interpreted in similar manner as the R8BW values and NewBW values for the downlink.

Figure 4C:
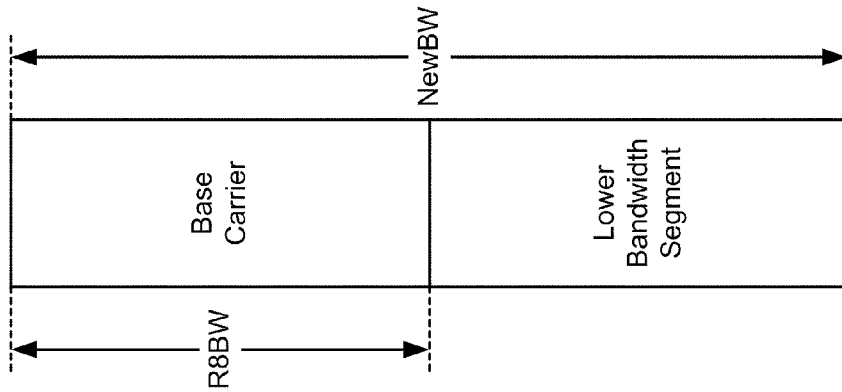
FIGS. 4A to 4C show three designs of the first and second system bandwidths.
Figure 4B:
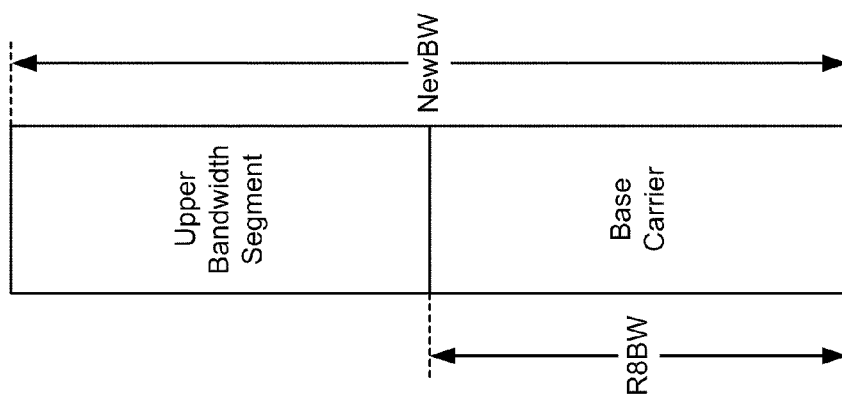
Figure 4A:
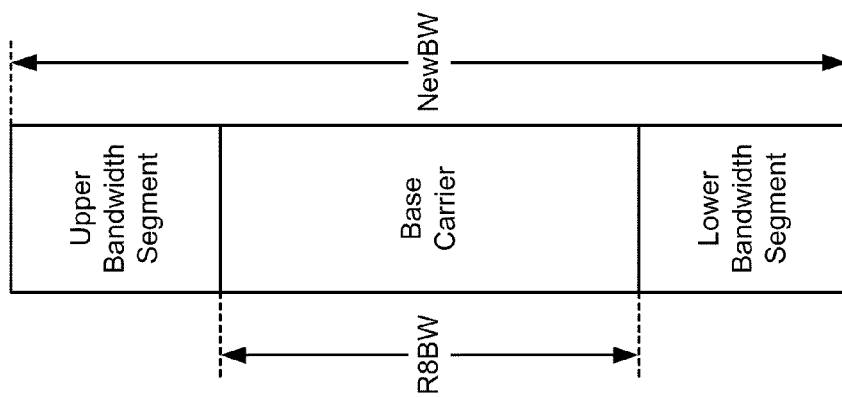

FIG. 4A shows a design of the first and second system bandwidths for the legacy and new UEs. In this design, the first system bandwidth may include a center part of a frequency range and may be referred to as a base carrier. The second system bandwidth may include the first system bandwidth, an upper bandwidth segment at a high end of the base carrier, and a lower bandwidth segment at a low end of the base carrier. The upper bandwidth segment may or may not be equal to the lower bandwidth segment.

FIG. 4B shows another design of the first and second system bandwidths for the legacy and new UEs. The first system bandwidth may include a lower part of a frequency range. The second system bandwidth may include the first system bandwidth and an upper bandwidth segment at the high end of the first system bandwidth.

FIG. 4C shows yet another design of the first and second system bandwidths for the legacy and new UEs. The first system bandwidth may include an upper part of a frequency range. The second system bandwidth may include the first system bandwidth and a lower bandwidth segment at the low end of the first system bandwidth.

FIGS. 4A to 4C show three designs of the first and second system bandwidths. In general, the second system bandwidth may completely overlap the first system bandwidth (e.g., as shown in FIGS. 4A to 4C) or may partially overlap the first system bandwidth. The second system bandwidth may include additional bandwidth on one or both sides of the first system bandwidth. The additional bandwidth may be accessible to the new UEs but not the legacy UEs. The first and second system bandwidths may have any suitable widths. For example, the second system bandwidth may be slightly larger or much larger than the first system bandwidth. For clarity, much of the description below assumes the design shown in FIG. 4A.

In an aspect, the legacy and new UEs may be multiplexed in different subframes using TDM. In one design, each subframe on the downlink may be designated as one of the following:

R8 subframe—a subframe in which the legacy UEs can be scheduled,

New subframe—a subframe in which the new UEs can be scheduled, and

Mixed subframe—a subframe in which the legacy and new UEs can be scheduled.

In one design, each subframe on the uplink may be similarly designated as an R8 subframe, or a new subframe, or a mixed subframe. In general, any number of subframe types may be supported. Each subframe on each link may be designated as one of the supported subframe types.

FIG. 5 shows an example of multiplexing legacy and new UEs in different subframes of a radio frame on the downlink or uplink. In this example, four subframes 0, 4, 5 and 9 are designated as R8 subframes for the legacy UEs, four subframes 1, 3, 6 and 8 are designated as new subframes for the new UEs, and two subframes 2 and 7 are designated as mixed subframes for the legacy and new UEs.

The available subframes for the downlink and uplink may be designated as R8, new, and mixed subframes such that HARQ operation can be supported for the legacy and new UEs. To support asynchronous HARQ on the downlink for the legacy UEs, an R8 or a mixed uplink subframe should be available Q subframes (e.g., four subframes) after each downlink subframe in which data transmission is sent to the legacy UEs, so that these UEs can send ACK/NACK feedback for the data transmission. To support synchronous HARQ on the uplink for the legacy UEs, an R8 or a mixed uplink subframe should be available S-Q subframes (e.g., four subframes) after each downlink subframe in which uplink grants are sent to the legacy UEs, so that these UEs can send data transmission on the uplink. Furthermore, an R8 or a mixed downlink subframe should be available S subframes (e.g., eight subframes) after each downlink subframe in which uplink grants are sent to the legacy UEs, so that ACK/NACK feedback can be sent to the legacy UEs for the data transmission on the uplink.

In one design, the same HARQ interlace structure may be used for both the legacy and new UEs. In this design, each HARQ interlace for the downlink may be designated as an R8 interlace that includes R8 subframes, or a new interlace that includes new subframes, or a mixed interlace that includes mixed subframes. Similarly, each HARQ interlace for the uplink may be designated as an R8 interlace, or a new interlace, or a mixed interlace. The HARQ interlaces for the downlink may be paired with the HARQ interlaces for the uplink to support efficient HARQ operation on both the downlink and uplink.

In another design, the available subframes for the downlink and uplink may be flexibly designated as R8, new, and mixed subframes, e.g., by taking into consideration various rules for HARQ operation on the downlink and uplink for the legacy and new UEs.

The second system bandwidth may overlap the first system bandwidth, e.g., as shown in FIG. 4A, 4B or 4C. The additional bandwidth in the second system bandwidth may be denoted as ΔNewBW and may be expressed as:

$$\Delta NewBW = NewBW - R8BW. \quad \text{Eq (1)}$$

The ΔNewBW bandwidth may be used for only the new UEs and may not be backward compatible for the legacy UEs. Similarly, the additional bandwidth for the uplink may be expressed as ΔNewBWUL=NewBWUL−R8BWUL.

As an example, the system may operate on a carrier with a 20 MHz system bandwidth. The R8BW bandwidth for the legacy UEs may include 100 resource blocks, and the NewBW bandwidth for the new UEs may include 110 resource blocks. The ΔNewBW bandwidth may include 10 resource blocks. This carrier may be one of multiple carriers for multi-carrier operation. Some of the guard band originally reserved for the legacy UEs may be used as the ΔNewBW bandwidth for the new UEs.

FIG. 6 shows a design of multiplexing legacy and new UEs in different subframes and on different parts of the overall system bandwidth. In the example shown in FIG. 6, the first system bandwidth occupies the center portion of the second system bandwidth, and the two edges of the second system bandwidth are accessible to only the new UEs. The center portion of each of subframes 0 through 9 may be used for the legacy UEs, or the new UEs, or both the legacy and new UEs. The two edges of the second system bandwidth in each subframe may be used for only the new UEs.

In one design, a mixed subframe may be either (i) a fully compatible mixed subframe referred to as an M1 mixed subframe or (ii) a partially compatible mixed subframe referred to as an M2 mixed subframe. An M1 mixed subframe may include all pertinent channels and signals so that the legacy UEs can be served in similar manner as in an R8 subframe. An M2 mixed subframe may include certain channels and signals (e.g., the PSS, SSS, PBCH, and reference signals) so that the legacy UEs can acquire the system and perform measurements. The legacy UEs may be scheduled for (i) data transmission in an M1 mixed subframe for the downlink and (ii) data transmission in an M1 mixed subframe for the uplink. The legacy UEs may not be scheduled for data transmission in an M2 mixed subframe for the downlink, which may appear like a multicast/broadcast single frequency network (MBSFN) subframe used to broadcast data in LTE. The legacy UEs may be scheduled for data transmission in an M2 mixed subframe for the uplink if pertinent control channels (e.g., the PCFICH, PHICH, and PDCCH) are transmitted in a corresponding M2 mixed subframe for the downlink.

In another aspect, control channels and overhead signals may be transmitted to support operation of the legacy and new UEs on the first and second system bandwidths. The control channels and overhead signals may be transmitted in various manners, as described below.

Figure 7A:
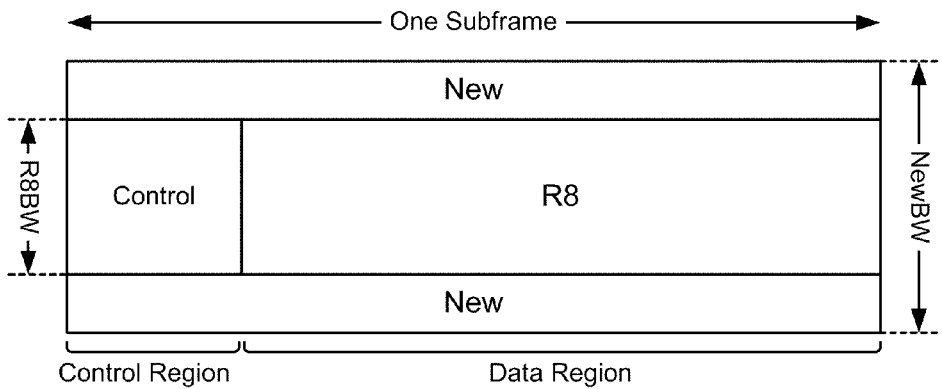
FIGS. 7A to 7C show three designs of transmitting overhead channels.
Figure 7B:
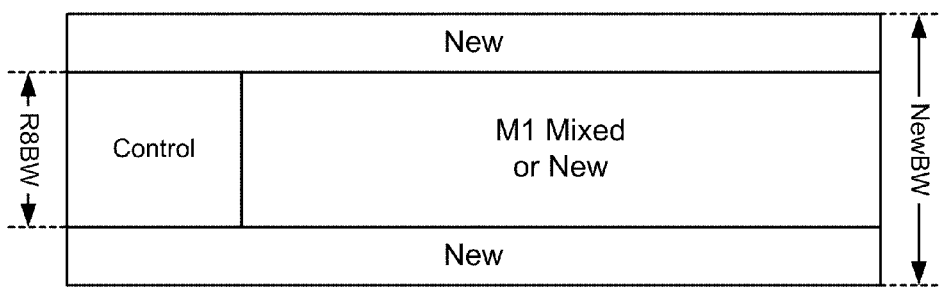

FIG. 7A shows a design of transmitting overhead channels and signals in an R8 subframe for the downlink. FIG. 7B shows a design of transmitting overhead channels and signals in an M1 mixed subframe or a new subframe for the downlink. In the designs shown in FIGS. 7A and 7B, an eNB may transmit the PSS, SSS and PBCH on the center six resource blocks to support system acquisition by all UEs. The eNB may transmit control channels such as the PCFICH, PHICH and PDCCH on the R8BW bandwidth in the control region of the subframe. In one design, the eNB does not transmit any control channel on the ΔNewBW bandwidth in the control region of the subframe. In this design, for the M1 mixed subframe shown in FIG. 7B, the eNB may transmit control information for the new UEs on the control channels sent on the R8BW bandwidth in the control region.

Figure 7C:
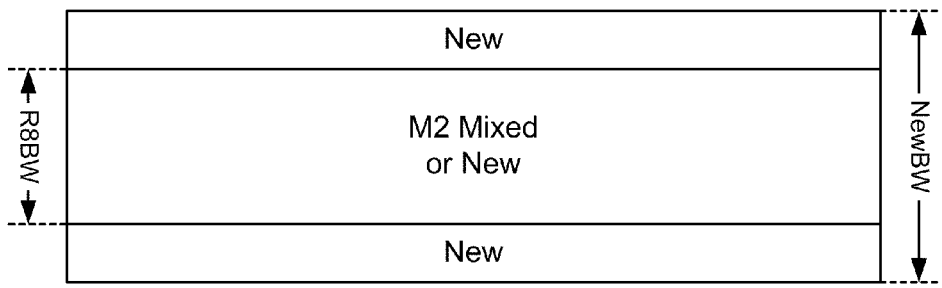

FIG. 7C shows a design of transmitting overhead channels and signals in an M2 mixed subframe or a new subframe for the downlink. In this design, an eNB may or may not transmit control channels in a control region of the subframe. In general, the eNB may transmit control channels for the new UEs using TDM, FDM, and/or some other multiplexing scheme.

In the designs shown in FIGS. 7A and 7B, an eNB may transmit control channels for both the legacy and new UEs on only the R8BW bandwidth (instead of on the NewBW bandwidth) in subframes that support the legacy UEs. The legacy and new UEs may then monitor only the R8BW bandwidth for control information. This design may have the following advantages:

Provide more efficient utilization of the ΔNewBW bandwidth, and

Allow the new UEs to monitor a smaller system bandwidth, which may result in less complexity and lower power consumption.

Less complexity and lower power consumption may be especially desirable for low category UEs designed to monitor a smaller system bandwidth, e.g., less than 20 MHz. For example, the system may support 10 MHz for the R8BW bandwidth and 20 MHz for the NewBW bandwidth. The new UEs may monitor just the center 10 MHz for overhead channels and signals but may receive data over the entire 20 MHz. The new UEs may thus have different bandwidths for the control region and data region.

In another design, new control channels may be transmitted on the ΔNewBW bandwidth for the downlink and/or the ΔNewBWUL bandwidth for the uplink. The new control channels may be similar to (i) the control channels transmitted on the R8BW bandwidth in the control region on the downlink and/or (ii) the PUCCH transmitted in the control region on the uplink. However, interleaving and hopping for the new control channels may be restricted to the ΔNewBW bandwidth on the downlink or the ΔNewBWUL bandwidth on the uplink. This design may be used when the control channels transmitted on the R8BW bandwidth are not sufficient to support both the legacy and new UEs. This may be the case, e.g., if the R8BW bandwidth is very small (e.g., in order to support low cost UEs) and the NewBW bandwidth is much larger. This design may also be used to support additional capabilities, such as interference mitigation between different types of cells (e.g., macro cells, femto cells, pico cells) and/or relay stations.

Control channels for the downlink and uplink may be transmitted in various manners to support operation of the legacy and new UEs on the first and second system bandwidths for the downlink and on the third and fourth system bandwidths for the uplink. Operation of some control channels for the downlink and uplink is described in further detail below.

The PHICH may be transmitted on the downlink and may carry ACK/NACK information to support data transmission on the uplink. The PHICH may be allocated a configurable amount of resources by setting a parameter $N_g$ to one of four possible values of 1/6, 1/2, 1 and 2. $N_g$ may be broadcast in the MIB and made available to all UEs. The resources for the PHICH may be given in units of PHICH groups. Each PHICH group may include 12 resource elements and may carry up to eight ACKs/NACKs. For LTE Release 8, the number of PHICH groups allocated to the PHICH in FDD may be expressed as:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Eq (2)}$$

where $N_{RB}^{DL}$ is the number of resource blocks (or system bandwidth) for the downlink, $N_{PHICH}^{group}$ is the number of PHICH groups allocated to the PHICH, and "⌈ ⌉" denotes a ceiling operator.

When multiple system bandwidths are supported for different UEs, the number of PHICH groups (and hence the amount of resources for the PHICH) may be defined in various manners. The number of PHICH groups for the legacy UEs may be defined based on the R8BW bandwidth applicable for these UEs. In one design, the number of PHICH groups for the new UEs may also be defined based on the R8BW bandwidth and may be expressed as:

$$N_{PHICH,New}^{group} = \begin{cases} \lceil N_g(N_{RB,R8}^{DL}/8) \rceil & \text{for normal cyclic prefix} \\ 2 \cdot \lceil N_g(N_{RB,R8}^{DL}/8) \rceil & \text{for extended cyclic prefix} \end{cases} \quad \text{Eq (3)}$$

where $N_{RB,R8}^{DL}$ is the number of resource blocks for the R8BW bandwidth, and $N_{PHICH,New}^{group}$ is the number of PHICH groups for the new UEs.

The design shown in equation (3) may allow the PHICH to be transmitted on the R8BW bandwidth and to support both the legacy and new UEs. In another design, the number of PHICH groups for the new UEs may be defined based on the NewBW bandwidth. This design may be used, e.g., when the R8BW is relatively small.

The PDCCH may be transmitted on the downlink and may carry downlink grants and/or uplink grants for UEs. A downlink grant may carry various parameters (e.g., the allocated downlink resources) for data transmission on the downlink. An uplink grant may carry various parameters (e.g., the allocated uplink resources) for data transmission on the uplink. A grant may also be referred to as an assignment, etc.

LTE Release 8 supports three downlink resource allocation schemes, which are referred to as type 0, type 1, and type 2. Resource allocation types 0 and 1 are based on bitmaps that indicate physical resource blocks (PRBs) assigned to UEs. Resource allocation type 2 is based on assignments of contiguous virtual resource blocks (VRBs), which are mapped to PRBs based on a mapping function.

For resource allocation types 0 and 1, the available PRBs are organized into $N_{RBG}$ resource block groups (RBGs), with each RBG including P (or possibly fewer) consecutive PRBs. P is dependent on the system bandwidth and given in Table 3. $N_{RBG}$ is dependent on the total number of PRBs and the value of P. For allocation type 1, the available RBGs are further organized into a number of RBG subsets, with each RBG subset including some of the RBGs. Each RBG subset may include V (or possibly fewer) PRBs in the RBGs included in that subset.

TABLE 3

| System Bandwidth ($N_{RB}^{DL}$) | RBG Size (P) |
|---|---|
| ≤10 | 1 |
| 11-26 | 2 |
| 27-63 | 3 |
| 64-110 | 4 |

For resource allocation type 0, a UE may be allocated any one of the $N_{RBG}$ RBGs. A bitmap of $N_{RBG}$ bits may be used to assign downlink resources to the UE. Each bit of the bitmap may be associated with one RBG and may be set to (i) a first value (e.g., '1') to indicate that the PRBs in the associated RBG are assigned to the UE or (ii) a second value (e.g., '0') to indicate that the PRBs in the associated RBG are not assigned to the UE.

For resource allocation type 1, a UE may be allocated any one of the PRBs in a selected RBG subset. A bitmap of V bits may be used to assign downlink resources to the UE. Each bit of the bitmap may be associated with one PRB in the selected RBG subset and may be set to (i) a first value (e.g., '1') to indicate that the associated PRB is assigned to the UE or (ii) a second value (e.g., '0') to indicate that the associated PRB is not assigned to the UE.

For resource allocation type 0, downlink resources may be assigned to UEs in units of RBG and in multiple of P PRBs. For resource allocation type 1, downlink resources may be assigned to UEs in units of PRBs, but the bitmap may be defined based on RBGs.

Downlink resources may be assigned in various manners when different system bandwidths are supported for the legacy and new UEs. In one design, a first RBG size ($P_{R8}$) may be determined based on R8BW bandwith and may be applicable for the legacy UEs. A second RBG size ($P_{new}$) may be determined based on the NewBW bandwidth and may be applicable for the new UEs. $P_{R8}$ may or may not be equal to $P_{new}$, depending on the R8BW and NewBW bandwidths. Furthermore, $P_{new}$ may or may not be divisible by $P_{R8}$. For example, $P_{new}$ may be equal to four when the NewBW bandwidth includes 100 PRBs, and $P_{R8}$ may be equal to three when the R8BW bandwidth includes 50 PRBs. When $P_{new}$ is not divisible by $P_{R8}$, it may be more difficult to schedule the legacy and new UEs in the same subframe.

In one design, $P_{new}$ may be defined to be divisible by $P_{R8}$ (e.g., by proper selection of the R8BW and NewBW bandwidths) in order to simplify scheduling, avoid resource collision, and minimize fragmentation. If $P_{new}$ is not divisible by $P_{R8}$, then scheduling may be performed such that resource collision and fragmentation may be minimized. This may be achieved, e.g., by assigning PRBs in units of the least common multiple of $P_{new}$ and $P_{R8}$, or by using a mixture of resource allocation types 0 and 1, and/or based on other schemes.

For resource allocation type 2, a UE may be allocated a set of contiguous localized or distributed VRBs. A localized VRB with index $n_{VRB}$ may be mapped directly to a PRB with index $n_{PRB}$, so that $n_{PRB}=n_{VRB}$. A distributed VRB with index $n_{VRB}$ may be mapped to a PRB with index $n_{PRB}$ based on a mapping function $f(\ )$, so that $n_{PRB}=f(n_{VRB})$ In LTE Release 8, the mapping function $f(\ )$ is based on a gap parameter $N_{gap}$, which is dependent on the system bandwidth. Table 4 gives $N_{gap1}$ and $N_{gap2}$ for different system bandwidths. $N_{gap}$ may be equal to either $N_{gap1}$ and $N_{gap2}$, as conveyed in a downlink grant. The gap parameter is defined such that contiguous VRBs are mapped to non-contiguous PRBs that are separated as much as possible in different slots.

Table 4

| System Bandwidth ($N_{RB}^{DL}$) | First Gap ($N_{gap1}$) | Second Gap ($N_{gap2}$) |
|---|---|---|
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Distributed resource allocation type 2 may be implemented in various manners when different system bandwidths are supported for the legacy and new UEs. In one design, a first gap value of $N_{gap,R8}$ may be determined based on the R8BW bandwidth and may be applicable for the legacy UEs. A second gap value of $N_{gap,new}$ may be determined based on the NewBW bandwidth and may be applicable for the new UEs. It may be desirable to have $N_{gap,new}$ be divisible by $N_{gap,R8}$. If $N_{gap,new}$ is not divisible by $N_{gap,R8}$, then scheduling may be performed such that resource collision can be avoided.

In another design, the R8BW and ΔNewBW bandwidths may be treated differently for the new UEs. A new UE may be assigned VRBs in the R8BW bandwidth and/or the ΔNewBW bandwidth. If an assigned VRB is within the R8BW bandwidth, then $N_{gap}$ may be determined based on the R8BW bandwidth, and the VRB may be mapped to a PRB based on $N_{gap}$ in similar manner as for a legacy UE. However, if the assigned VRB is within the ΔNewBW bandwidth, then $N_{gap}$ may be determined based on either (i) the ΔNewBW bandwidth if the additional bandwidth is on only one side of the R8BW bandwidth or (ii) a ΔNewBW/2 bandwidth if the additional bandwidth is split on both sides of the R8BW bandwidth. The VRB may then be mapped to a PRB in the ΔNewBW bandwidth based on $N_{gap}$. In this design, hopping may be self-contained within the ΔNewBW bandwidth.

In yet another design, mirror hopping may be used for VRBs that are within the ΔNewBW bandwidth. With mirror hopping, a VRB may be mapped to (i) one PRB at a particular distance from one edge of the system bandwidth in one slot and (ii) another PRB at an equal distance from an opposite edge of the system bandwidth in another slot.

As an example, the R8BW bandwidth may include 25 PRBs with indices of 0 through 24, and the NewBW bandwidth may include 27 PRBs with indices of 0 through 26. The ΔNewBW bandwidth may include two PRBs, or one PRB on each side of the R8BW bandwidth. PRBs 0 through 24 for the R8BW bandwidth may correspond to PRBs 1 through 25 for the NewBW bandwidth. A new UE may be assigned three consecutive VRBs with a starting index of 0. The first VRB 0 may be mapped to PRB 0 in one slot and to PRB 26 in another slot, e.g., with mirror hopping. VRB 0 may thus be mapped to PRBs within the ΔNewBW bandwidth. The remaining VRBs 1 and 2 may be mapped to PRBs within the R8BW bandwidth based on the mapping function used for the legacy UEs.

In one design, PRBs and VRBs within the R8BW bandwidth and PRBs and VRBs within the NewBW bandwidth may be assigned different indices, e.g., as illustrated by the example above. In this design, a given PRB or VRB may have different indices for the R8BW and NewBW bandwidths. In another design, PRBs and VRBs within the R8BW bandwidth may be assigned unique indices, and PRBs and VRBs within the ΔNewBW bandwidth may also be assigned unique indices. In this design, a given PRB or VRB may have the same index for the R8BW and NewBW bandwidths. In general, the PRBs and VRBs within the R8BW and NewBW bandwidths may be assigned indices in various manners. The mapping of VRBs to PRBs for distributed resource allocation type 2 may be dependent on the indices assigned to the PRBs and VRBs.

LTE Release 8 supports three uplink resource allocation schemes, which are referred to as no hopping, type-1 PUSCH hopping, and type-2 PUSCH hopping. For all three resource allocation schemes, a UE may be assigned one or more contiguous VRBs for the PUSCH in the data region. For no hopping, the VRBs may be mapped to the same PRBs in both slots of a subframe. For type-1 PUSCH hopping, the VRBs may be mapped to different PRBs in the first and second slots of a subframe based on fixed offset, which may be similar to the gap parameter for the downlink. For type-2 PUSCH hopping, the VRBs may be mapped to different PRBs in the first and second slots of a subframe based on mirror hopping and/or subband hopping.

Type-1 and type-2 PUSCH hopping may be implemented in various manners when different system bandwidths are supported for the legacy and new UEs. In one design, PUSCH hopping for the legacy UEs may be based on the R8BWUL bandwidth, and PUSCH hopping for the new UEs may be based on the NewBWUL bandwidth. Scheduling may be performed in a manner to avoid collision between the legacy and new UEs.

In another design, the R8BWUL and ΔNewBWUL bandwidths may be treated differently for the new UEs. A new UE may be assigned VRBs in the R8BWUL and/or ΔNewBWUL bandwidths. If an assigned VRB is within the R8BWUL bandwidth, then PUSCH hopping may be based on the R8BWUL bandwidth, and the VRB may be mapped to a PRB in similar manner as for a legacy UE. However, if the assigned VRB is within the ΔNewBWUL bandwidth, then PUSCH hopping may be based on either (i) the ΔNewBWUL bandwidth if the additional bandwidth is on only one side of the R8BWUL bandwidth or (ii) a ΔNewBWUL/2 bandwidth if the additional bandwidth is split on both sides of the R8BWUL bandwidth. The VRB may then be mapped to a PRB in the ΔNewBWUL bandwidth. In this design, PUSCH hopping may be self-contained within the ΔNewBWUL bandwidth. In yet another design, mirror hopping may be used for VRBs that are within the ΔNewBWUL bandwidth.

In one design, PRBs and VRBs within the R8BWUL bandwidth and PRBs and VRBs within the NewBWUL bandwidth may be assigned different indices. In this design, a given PRB or VRB may have different indices for the R8BWUL and NewBWUL bandwidths. In another design, PRBs and VRBs within the R8BWUL bandwidth may be assigned unique indices, and PRBs and VRBs within the ΔNewBWUL bandwidth may also be assigned unique indices. In this design, a given PRB or VRB may have the same index for the R8BWUL and NewBWUL bandwidths. In general, the PRBs and VRBs within the R8BWUL and NewBWUL bandwidths may be assigned indices in various manners.

An eNB may transmit a cell-specific reference signal (CRS) on the downlink to enable the legacy and new UEs to perform channel estimation, channel quality measurement, and/or other functions. The eNB may transmit the CRS in various manners.

Figure 8:
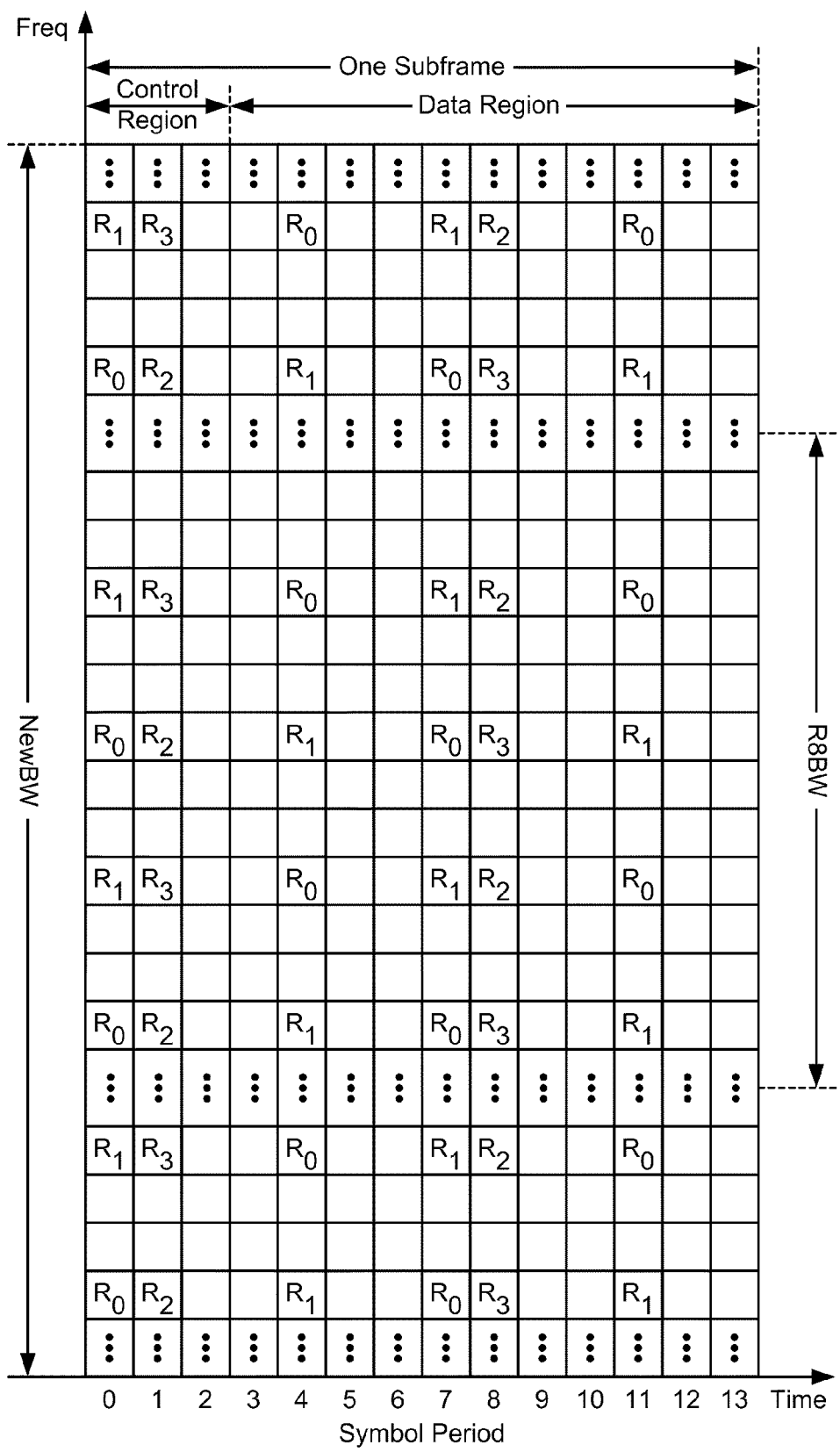
FIG. 8 shows transmission of a cell-specific reference signal.

FIG. 8 shows transmission of the CRS by an eNB with four antennas in a subframe with the normal cyclic prefix. The eNB may transmit the CRS from antennas 0 and 1 in symbol periods 0, 4, 7 and 11 and from antennas 2 and 3 in symbol periods 1 and 8. In FIG. 8, for a given resource element with label $R_a$, a reference symbol may be transmitted on that resource element from antenna a, and no modulation symbols may be transmitted on that resource element from the other antennas. As shown in FIG. 8, the CRS may be transmitted on every 6-th subcarrier from each antenna. The subcarriers used for the CRS for antenna 0 (or antenna 2) may be offset by three subcarriers from the subcarriers used for the CRS for antenna 1 (or antenna 3). If the eNB has two antennas, then the eNB may transmit the CRS from antennas 0 and 1 in symbol periods 0, 4, 7 and 11.

Modulation symbols for the CRS may be generated based on a pseudo-random sequence. This pseudo-random sequence may be initialized with a value of $c_{init}$ at the start of each OFDM symbol. The first 1600 bits of the pseudo-random sequence may be discarded, and each subsequent pair of bits may be used to generate a modulation/reference symbol for the CRS.

In one design, the CRS may be transmitted across the R8BW bandwidth in the R8 subframes and mixed subframes in the same manner as in LTE Release 8. In one design, the CRS may be transmitted across the R8BW bandwidth in the new subframes, e.g., in the first OFDM symbol for two antennas or in the first two symbols for four antennas in order to maintain compatibility for the legacy UEs.

In one design, the CRS may be transmitted on the ΔNewBW bandwidth of a subframe. In another design, a UE-specific reference signal (UE-RS) may be transmitted on the ΔNewBW bandwidth of a subframe. In yet another design, one or more new types of CRS (e.g., a channel state information reference signal (CSI-RS) used for channel quality measurement) may be transmitted on the ΔNewBW bandwidth of a subframe. In general, zero or more reference signals may be transmitted on the ΔNewBW bandwidth of a subframe.

The CRS may be transmitted on the ΔNewBW bandwidth of a subframe in various manners. In one design, the CRS in the ΔNewBW bandwidth may be generated by an extending the CRS in the R8BW bandwidth. This may be achieved by transmitting the CRS in the same OFDM symbols and with the same subcarrier shift and staggering pattern as in the R8BW bandwidth. For a given antenna, the subcarriers used for the CRS may be spaced apart by six subcarriers, and the same subcarrier spacing may be continued across the R8BW and ΔNewBW boundary.

The pseudo-random sequence may also be extended across the R8BW and ΔNewBW boundary. A pseudo-random sequence generator may be operated beyond the highest frequency in the R8BW bandwidth (if needed) to generate more bits for the CRS in the ΔNewBW bandwidth. The pseudo-random sequence generator may also be operated below the lowest frequency in the R8BW bandwidth (if needed) to generate bits for the CRS in the ΔNewBW bandwidth. In LTE Release 8, the pseudo-random sequence is initialized and then advanced by 1600 bits before obtaining the first bit used for the CRS. In one design, the initial advance of 1600 bits may be reduced accordingly, so that a sufficient number of bits can be generated for the CRS in a ΔNewBW portion that is lower than the R8BW bandwidth.

In another design, the pseudo-random sequence for the CRS in the ΔNewBW portion that is lower than the R8BW bandwidth may be generated in a wrap around fashion. In this design, the pseudo-random sequence generator may be operated to generate more bits for the CRS in the ΔNewBW portion that is higher than the R8BW bandwidth. The pseudo-random sequence generator may be further operated to generate more bits for the CRS in the ΔNewBW portion that is lower than the R8BW bandwidth. The pseudo-random sequence may thus continue from the R8BW bandwidth to the higher ΔNewBW portion and then further continue to the lower ΔNewBW portion. This wrap-around design may be used even if the higher ΔNewBW portion includes zero subcarriers, e.g., as shown in FIG. 4C. The bits for the CRS in the ΔNewBW bandwidth may also be generated in other manners.

The designs described above may also be used for other types of reference signals such as the UE-RS and CSI-RS. For example, a PN sequence for the UE-RS or CSI-RS may be generated based on any of the designs described above.

The PUCCH may be transmitted on the uplink and may carry control information from UEs. In one design, the control region for the uplink may be confined to the R8BWUL bandwidth, e.g., in similar manner as confining the control region for the downlink to the R8BW bandwidth.

Figure 9:
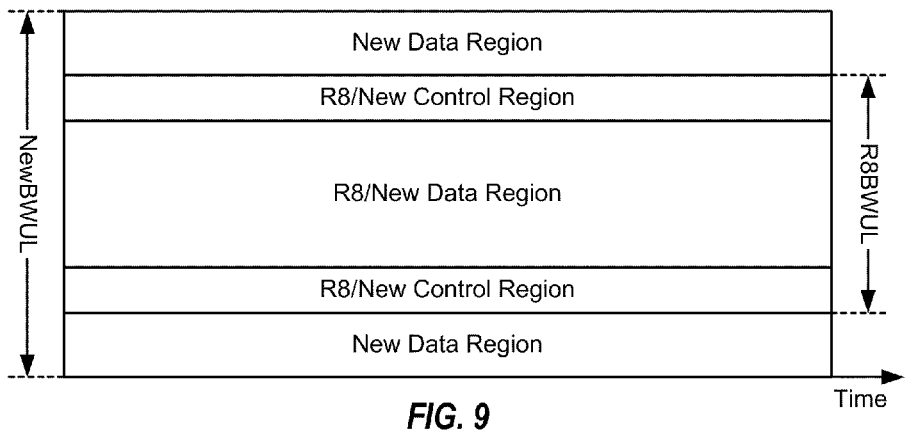
FIG. 9 shows exemplary control and data regions on the uplink.

FIG. 9 shows a design of the region control and data region for the uplink with different system bandwidths for the legacy and new UEs. In this design, the control region for the uplink may be defined from the two edges of the R8BWUL bandwidth and may grow toward the center frequency. A first data region for the legacy and new UEs may cover the remaining frequency in the R8BWUL bandwidth that is not used for the control region. A second data region for the new UEs may cover the ΔNewBWUL bandwidth. The first data region may be referred to as an R8/new data region, and the second data region may be referred to as a new data region.

In the design shown in FIG. 9, the legacy and new UEs may transmit control information on the PUCCH in the control region, e.g., as specified in LTE Release 8 by treating the R8BW bandwidth as the system bandwidth. The control region may be shared by the legacy and new UEs. The legacy UEs may be scheduled for data transmission in the R8/new data region. The new UEs may be scheduled for data transmission in the R8/new region and/or the new data region.

A UE may be configured to periodically transmit a sounding reference signal (SRS) to allow an eNB to estimate the channel quality of the uplink. A legacy UE may transmit the SRS across only the R8BWUL bandwidth. In one design, a new UE may transmit the SRS across only the R8BWUL bandwidth and not on the ΔNewBWUL bandwidth. This design may be used for low category UEs that may monitor a system bandwidth of less than 20 MHz. This design may also be used for new UEs that might be scheduled on only the R8BWUL bandwidth.

In another design, a new UE may transmit the SRS across the NewBWUL bandwidth. In a first design, the SRS may be defined separately for the R8BWUL bandwidth and the ΔNewBWUL bandwidth, e.g., using the features described above for the CSR on the downlink. In a second design, the SRS may be defined for the entire NewBWUL bandwidth. For the second design, the legacy and new UEs may be scheduled for SRS transmission such that collisions between the legacy and new UEs can be avoided. A new UE may be configured (e.g., via a signaling bit) to transmit the SRS based on the first or second design. This signaling bit may be (i) semi-static and sent via upper layer (e.g., Layer 3) signaling or (ii) dynamic and sent via lower layer (e.g., Layer 1 or 2) signaling.

A UE may estimate the channel quality of the downlink and may send CQI information indicative of the downlink channel quality. The system bandwidth may be partitioned into a number of subbands. The UE may estimate downlink channel quality and send CQI information for each subband of interest.

A legacy UE may estimate downlink channel quality and send CQI information for subbands defined based on the R8BW bandwidth, e.g., as defined in LTE Release 8. A new UE may estimate downlink channel quality and send CQI information for subbands that may be defined in various manners.

In one design, the NewBW bandwidth may be partitioned into subbands, and the new UEs may report CQI information for these subbands. In this design, the subbands for the NewBW bandwidth may not match the subbands for the R8BW bandwidth. In another design, the R8BW portion of the NewBW bandwidth may be partitioned into subbands in similar manner as for the R8BW bandwidth, and the ΔNewBW bandwidth may be partitioned into one or more additional subbands. In this design, the subbands for the NewBW bandwidth may include the subbands for the R8BW bandwidth as well as one or more additional subbands. This design may be preferable if the interference levels on the ΔNewBW bandwidth are substantially different from the interference levels on the R8BW bandwidth. This may be the case, e.g., in a femto-cell environment with few guard subcarriers.

In general, any channel feedback information may be conveyed based on the designs described above for CQI information. Channel feedback information may comprise CQI information indicative of channel quality, precoding matrix indicator (PMI) information indicative of precoding weights, rank indicator (RI) information indicative of the number of data streams to transmit, explicit and implicit feedback, channel feedback (e.g., based on CSI-RS), etc. Channel state information for the R8BW bandwidth and ΔNewBW bandwidth may be sent separately or jointly. For example, a new UE may send (i) a wideband CQI report for the NewBW bandwidth or (ii) two separate CQI reports for the R8BW bandwidth and ΔNewBW bandwidth. The two separate CQI reports may be encoded separately or jointly.

Figure 10:
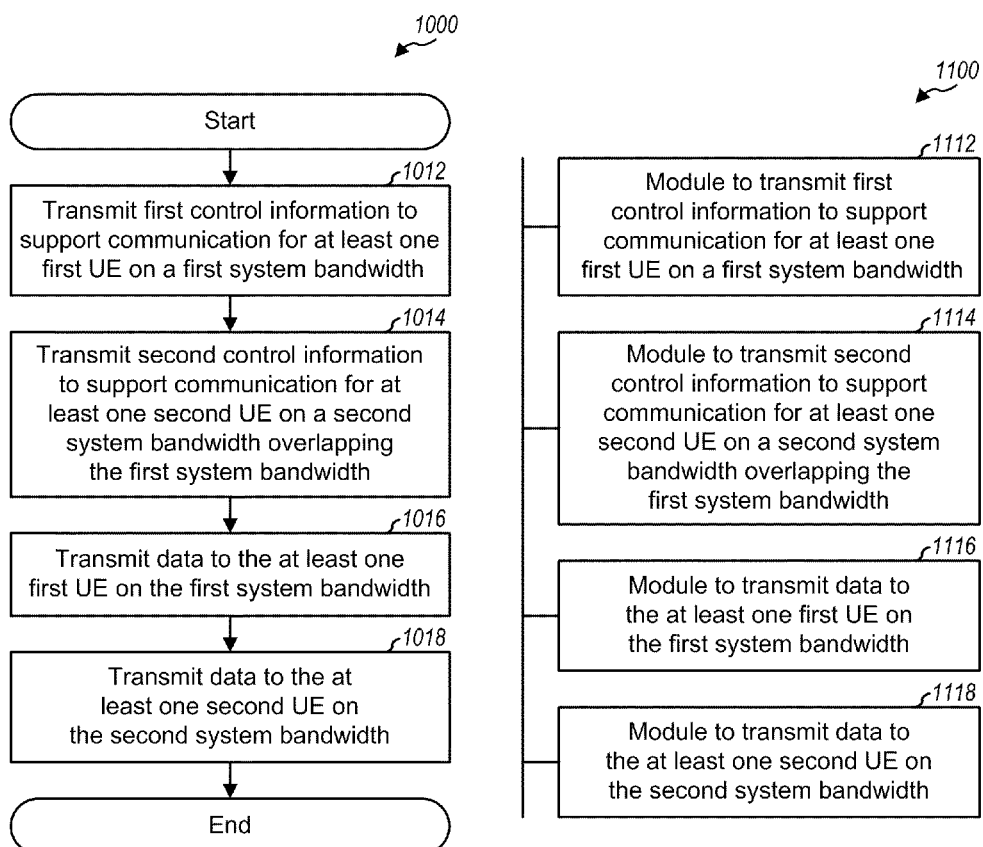
FIG. 10 shows a process for supporting communication by a base station.

FIG. 10 shows a design of a process 1000 for supporting communication. Process 1000 may be performed by a base station/eNB (as described below) or by some other entity. The base station may transmit first control information to support communication for at least one first UE on a first system bandwidth (e.g., the R8BW bandwidth) (block 1012). The base station may transmit second control information to support communication for at least one second UE on a second system bandwidth (e.g., the NewBW bandwidth) overlapping the first system bandwidth (block 1014). The base station may transmit data to the at least one first UE on the first system bandwidth (block 1016). The base station may transmit data to the at least one second UE on the second system bandwidth (block 1018).

In one design, the second system bandwidth may completely overlap the first system bandwidth and may comprise the first system bandwidth and additional bandwidth (e.g., the ΔNewBW bandwidth), as shown in FIG. 4A, 4B or 4C. In another design, the second system bandwidth may partially overlap the first system bandwidth and may comprise a portion of the first system bandwidth and additional bandwidth.

In one design, the base station may transmit the second control information on only the first system bandwidth and may transmit data to the second UE(s) on the second system bandwidth. The second UE(s) may have different system bandwidths for control information and data.

The base station may transmit the first and second control information in various manners. In one design, the base station may transmit at least one control channel on the first system bandwidth and may transmit the first and second control information on the at least one control channel. In another design, the base station may transmit at least one control channel on the first system bandwidth and may transmit at least one additional control channel on the additional bandwidth. The base station may transmit the first control information on the at least one control channel and may transmit the second control information on the at least one control channel and/or the at least one additional control channel.

Sufficient resources may be assigned to the control channel(s) used to transmit the first and second control information. In one design, the base station may determine resources for a control channel (e.g., the PHICH used to send ACK and NACK information to the first and second UEs) based on the first system bandwidth instead of the second system bandwidth.

The base station may transmit data to the first and second UEs in various manners. In one design, the first system bandwidth may be partitioned into RBGs of a first size, and the second system bandwidth may be partitioned into RBGs of a second size. The second size may be different from the first size and/or may be an integer multiple of the first size. The base station may transmit data to the first UE(s) on resources allocated based on the RBGs of the first size. The base station may transmit data to the second UE(s) on resources allocated based on the RBGs of the second size.

In another design, the base station may transmit data to the first UE(s) with frequency hopping based on a first gap value and may transmit data to the second UE(s) with frequency hopping based on a second gap value. The first and second gap values may be determined based on the first and second system bandwidths, respectively, and may determine the amount to hop for the first and second UEs, respectively. The second gap value may be different from the first gap value and/or may be an integer multiple of the first gap value.

In yet another design, the base station may transmit data to the first UE(s) with frequency hopping within the first system bandwidth. The base station may transmit data to the second UE(s) with frequency hopping within the second system bandwidth. For example, the base station may transmit data to the second UE(s) with frequency hopping (i) within the first system bandwidth for resources mapped to the first system bandwidth and (ii) within the additional bandwidth for resources mapped to the additional bandwidth.

In one design, the base station may transmit a CRS across only the first system bandwidth. In another design, the base station may transmit a CRS across the first system bandwidth and may also transmit the CRS and/or at least one additional reference signal on the additional bandwidth.

The first UE(s) may communicate on the first system bandwidth for the downlink and on a third system bandwidth (e.g., the R8BWUL bandwidth) for the uplink. The second UE(s) may communicate on the second system bandwidth for the downlink and on a fourth system bandwidth (e.g., the NewBWUL bandwidth) for the uplink. The fourth system bandwidth may overlap the third system bandwidth and may comprise the third system bandwidth and additional bandwidth (e.g., the ΔNewBWUL bandwidth).

In one design, the base station may receive third control information from the first UE(s) on the third system bandwidth and may receive fourth control information from the second UE(s) on the third system bandwidth. In one design, the base station may receive data transmitted by the first UE(s) with frequency hopping within the third system bandwidth. The base station may receive data transmitted by the second UE(s) (i) with frequency hopping within the fourth system bandwidth or (ii) with frequency hopping within the third system bandwidth for resources mapped to the third system bandwidth and within the additional bandwidth for resources mapped to the additional bandwidth.

In one design, the base station may receive at least one SRS transmitted by the first UE(s) across the third system bandwidth. The base station may receive at least one other SRS transmitted by the second UE(s) across only the third system bandwidth or across the fourth system bandwidth.

In one design, the base station may receive first CQI information from the first UE(s) for first subbands defined based on the third system bandwidth. In one design, the base station may receive second CQI information from the second UE(s) (i) for second subbands defined based on the fourth system bandwidth or (ii) for the first subbands and at least one additional subband defined based on the additional bandwidth for the uplink.

The base station may support communication for the first and second UEs on the first and second system bandwidths in other manners. For example, the base station may transmit control information and/or data to the first and second UEs in other manners. The base station may transmit other overhead channels and/or overhead signals to the UEs. The base station may also receive control information and/or data from the first and second UEs in other manners and/or may receive other overhead signals from the UEs.

Figure 11:
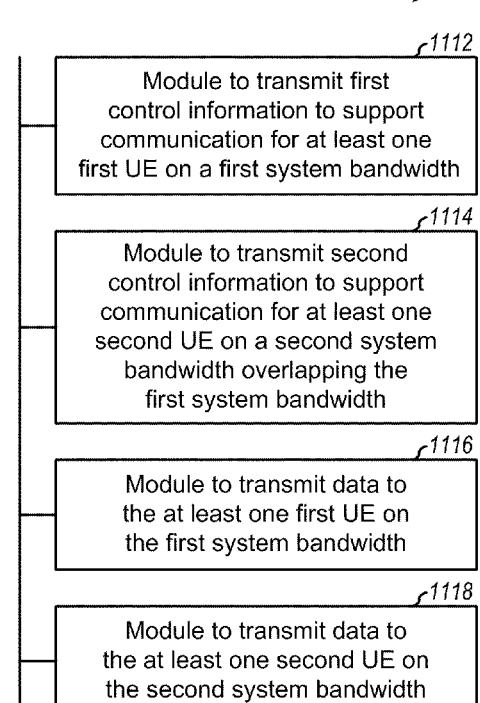
FIG. 11 shows an apparatus for supporting communication by a base station.

FIG. 11 shows a design of an apparatus 1100 for supporting communication. Apparatus 1100 includes a module 1112 to transmit first control information to support communication for at least one first UE on a first system bandwidth, a module 1114 to transmit second control information to support communication for at least one second UE on a second system bandwidth overlapping the first system bandwidth, a module 1116 to transmit data to the at least one first UE on the first system bandwidth, and a module 1118 to transmit data to the at least one second UE on the second system bandwidth.

FIG. 12 shows a design of a process 1200 for communicating in a wireless system. Process 1200 may be performed by a UE (as described below) or by some other entity. The UE may receive control information from a base station (block 1212). The base station may transmit first control information to support communication for at least one first UE on a first system bandwidth and may transmit second control information to support communication for at least one second UE on a second system bandwidth overlapping the first system bandwidth. The UE may be one of the at least one second UE. The UE may communicate with the base station based on the control information, which may comprise some or all of the second control information (block 1214).

In one design, the UE may receive control information from the base station on only the first system bandwidth and may receive data from the base station on the second system bandwidth. The UE may thus have different system bandwidths for control information and data.

In one design, the UE may receive ACK and NACK information from a control channel (e.g., the PHICH). The resources for the control channel may be determined based on the first system bandwidth instead of the second system bandwidth.

In one design, the UE may receive data transmitted by the base station on at least one resource block. The first system bandwidth may be partitioned into RBGs of a first size, and the second system bandwidth may be partitioned into RBGs of a second size. The second size may be different from the first size and/or may be an integer multiple of the first size. The at least one resource block may be determined based on the RBGs of the second size. In another design, the UE may receive data transmitted by the base station with frequency hopping. The base station may transmit data to the first UE(s) with frequency hopping based on a first gap value and may transmit data to the second UE(s) with frequency hopping based on a second gap value. The second gap value may be different from the first gap value and/or may be an integer multiple of the first gap value. In yet another design, the UE may receive data transmitted by the base station with frequency hopping within the second system bandwidth, e.g., (i) within the first system bandwidth for resources mapped to the first system bandwidth and (ii) within the additional bandwidth for resources mapped to the additional bandwidth. The UE may also receive data transmitted by the base station in other manners.

In one design, the UE may receive a CRS transmitted across only the first system bandwidth by the base station. In another design, the UE may receive a CRS transmitted across the second system bandwidth by the base station.

In one design, the UE may send channel feedback information (e.g., CQI information, PMI information, RI information, etc.) to the base station for (i) subbands defined based on the first system bandwidth, or (ii) subbands defined based on the second system bandwidth, or (iii) subbands defined based on the first system bandwidth and at least one additional subband defined based on the additional bandwidth. The UE may send a single report comprising channel feedback information for the second system bandwidth. Alternatively, the UE may send (i) a first report comprising channel feedback information for the first system bandwidth and (ii) a second report comprising channel feedback information for the additional bandwidth. The UE may encode the first and second reports separately or jointly.

The first UE(s) may communicate on the first system bandwidth for the downlink and on a third system bandwidth for the uplink. The second UE(s) may communicate on the second system bandwidth for the downlink and on a fourth system bandwidth for the uplink. The fourth system bandwidth may comprise the third system bandwidth and additional bandwidth.

In one design, the UE may transmit uplink control information to the base station on the third system bandwidth. In one design, the UE may transmit data to the base station with frequency hopping within the fourth system bandwidth. In another design, the UE may transmit data with frequency hopping (i) within the third system bandwidth for resources mapped to the third system bandwidth and (ii) within the additional bandwidth for resources mapped to the additional bandwidth.

In one design, the UE may transmit a SRS to the base station across the third system bandwidth or across the fourth system bandwidth. The UE may also send other reference signal to the base station.

The UE may receive control information and data from the base station in other manners. The UE may also receive other overhead channels and/or signals from the base station. The UE may also transmit control information and data to the base station in other manners and/or may transmit other overhead signals to the base station.

FIG. 13 shows a design of an apparatus 1300 for supporting communication. Apparatus 1300 includes a module 1312 to receive control information from a base station at a UE, and a module 1314 to communicate with the base station based on the control information. The base station may transmit first control information to support communication for at least one first UE on a first system bandwidth and may transmit second control information to support communication for at least one second UE on a second system bandwidth overlapping the first system bandwidth. The UE may be one of the at least one second UE.

Figures 14, 15:
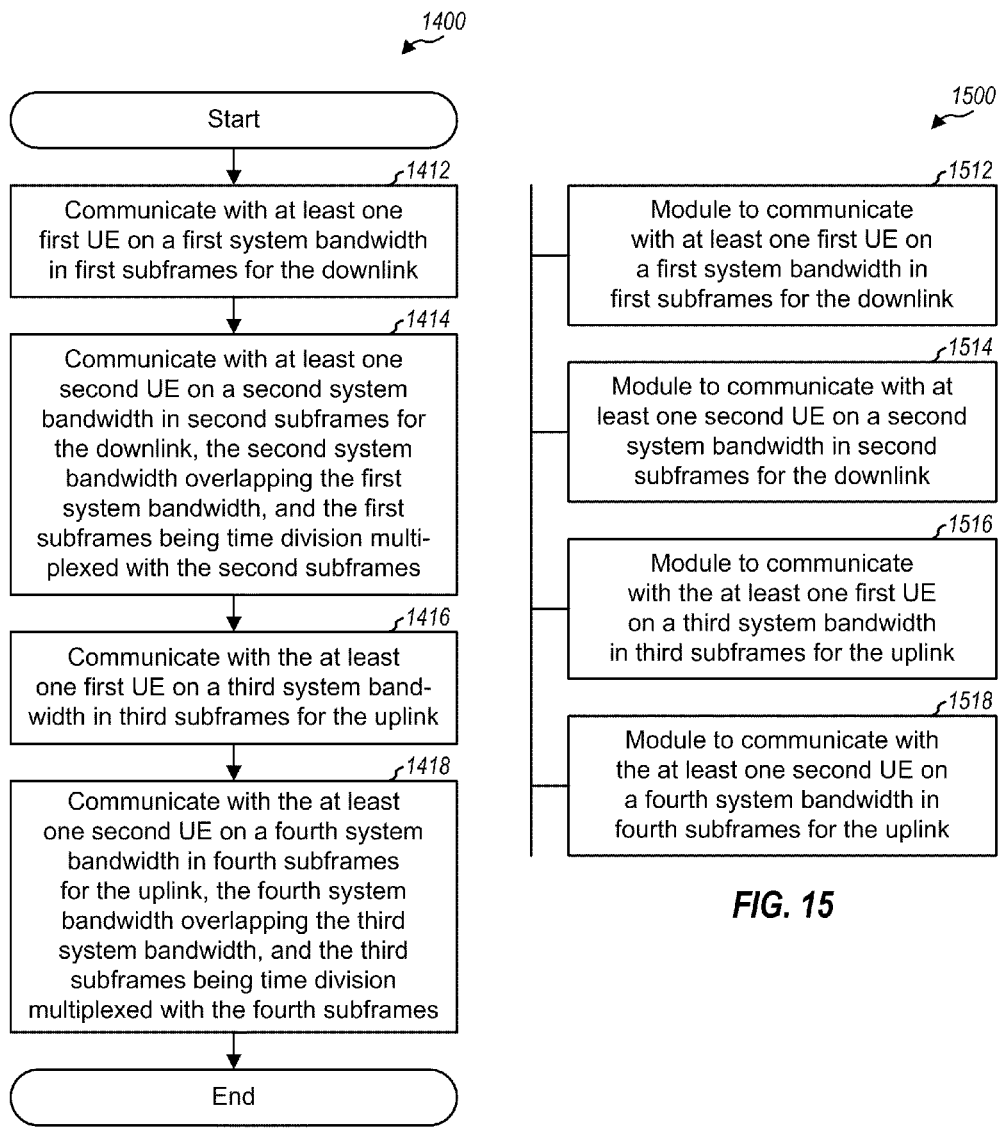
FIG. 14 shows another process for supporting communication.
FIG. 15 shows another apparatus for supporting communication.

FIG. 14 shows a design of a process 1400 for supporting communication. Process 1400 may be performed by a base station/eNB (as described below) or by some other entity. The base station may communicate with at least one first UE on a first system bandwidth in first subframes for the downlink (block 1412). The base station may communicate with at least one second UE on a second system bandwidth in second subframes for the downlink (block 1414). The second system bandwidth may overlap the first system bandwidth, and the first subframes may be TDMed with the second subframes. The base station may communicate with the first UE(s) on a third system bandwidth in third subframes for the uplink (block 1416). The base station may communicate with the second UE(s) on a fourth system bandwidth in fourth subframes for the uplink (block 1418). The fourth system bandwidth may overlap the third system bandwidth, and the third subframes may be TDMed with the fourth subframes.

In one design, for each first subframe in which data transmission is sent on the downlink to the first UE(s), a third subframe may be made available on the uplink, after a predetermined delay, to send ACK and NACK information for the data transmission. In one design, for each first subframe in which at least one uplink grant is sent to the first UE(s), a third subframe may be made available on the uplink, after a first predetermined delay, for data transmission on the uplink by the first UE(s). Another first subframe may also be made available on the downlink, after a second predetermined delay, to send ACK and NACK information for the data transmission sent by the first UE(s). Data transmission for the second UE(s) may be supported in similar manner.

FIG. 15 shows a design of an apparatus 1500 for supporting communication. Apparatus 1500 includes a module 1512 to communicate with at least one first UE on a first system bandwidth in first subframes for the downlink, a module 1514 to communicate with at least one second UE on a second system bandwidth in second subframes for the downlink, a module 1516 to communicate with the at least one first UE on a third system bandwidth in third subframes for the uplink, and a module 1518 to communicate with the at least one second UE on a fourth system bandwidth in fourth subframes for the uplink. The second system bandwidth may overlap the first system bandwidth, and the fourth system bandwidth may overlap the third system bandwidth. The first subframes may be TDMed with the second subframes, and the third subframes may be TDMed with the fourth subframes.

The modules in FIGS. 11, 13 and 15 may comprise processors, electronic devices, hardware devices, electronic components, logical circuits, memories, software codes, firmware codes, etc., or any combination thereof.

Figure 16:
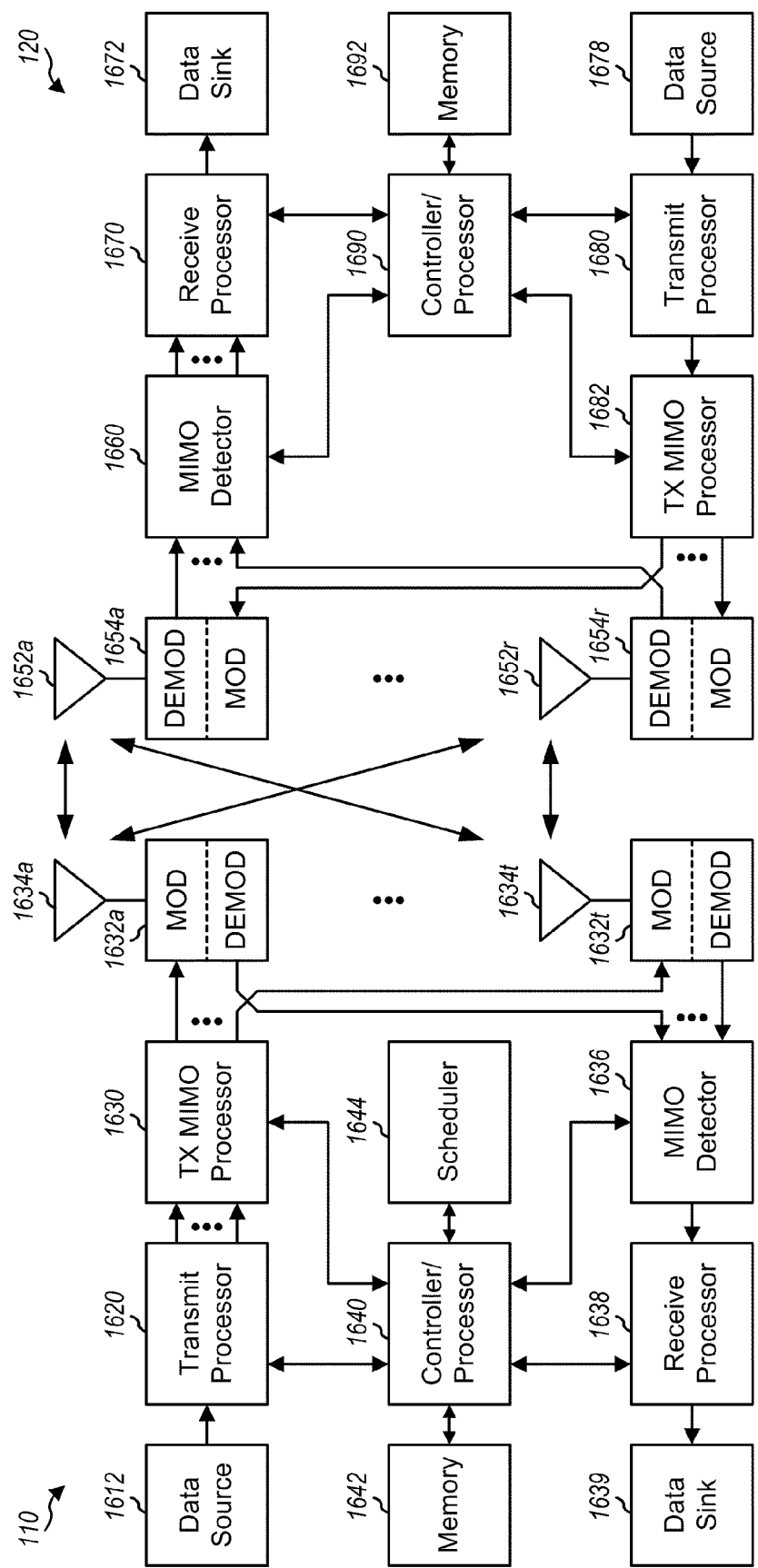
FIG. 16 shows a block diagram of a base station and a UE.

FIG. 16 shows a block diagram of a design of a base station/eNB 110 and a UE 120, which may be one of the base stations/eNBs and one of the UEs in FIG. 1. Base station 110 may be equipped with T antennas 1634a through 1634t, and UE 120 may be equipped with R antennas 1652a through 1652r, where in general T≥1 and R≥1.

At base station 110, a transmit processor 1620 may receive data from a data source 1612 for one or more UEs, process (e.g., encode and modulate) the data for each UE based on one or more modulation and coding schemes selected for that UE, and provide data symbols for all UE. Transmit processor 1620 may also process control information (e.g., for the PHICH, PDCCH, PBCH, etc.) and provide control symbols. Transmit processor 1620 may also generate reference symbols for synchronization signals and reference signals. A transmit (TX) multiple-input multiple-output (MIMO) processor 1630 may precode the data symbols, the control symbols, and/or the reference symbols (if applicable) and may provide T output symbol streams to T modulators (MOD) 1632a through 1632t. Each modulator 1632 may process its output symbol stream (e.g., for OFDM, etc.) to obtain an output sample stream. Each modulator 1632 may further condition (e.g., convert to analog, filter, amplify, and upconvert) its output sample stream and generate a downlink signal. T downlink signals from modulators 1632a through 1632t may be transmitted via T antennas 1634a through 1634t, respectively.

At UE 120, R antennas 1652a through 1652r may receive the T downlink signals from eNB 110, and each antenna 1652 may provide a received signal to an associated demodulator (DEMOD) 1654. Each demodulator 1654 may condition (e.g., filter, amplify, downconvert, and digitize) its received signal to obtain samples and may further process the samples (e.g., for OFDM, etc.) to obtain received symbols. A MIMO detector 1660 may obtain received symbols from all demodulators 1654, perform MIMO detection on the received symbols if applicable, and provide detected symbols. A receive processor 1670 may process (e.g., demodulate and decode) the detected symbols, provide decoded data for UE 120 to a data sink 1672, and provide decoded control information to a controller/processor 1690.

On the uplink, at UE 120, data from a data source 1678 and control information (e.g., for the PUCCH, etc.) from controller/processor 1690 may be processed by a transmit processor 1680, precoded by a TX MIMO processor 1682 if applicable, further processed by modulators 1654a through 1654r, and transmitted to base station 110. At base station 110, the uplink signals from UE 120 may be received by antennas 1634, processed by demodulators 1632, detected by a MIMO detector 1636 if applicable, and further processed by a receive processor 1638 to recover the data and control information sent by UE 120. Processor 1638 may provide the recovered data to a data sink 1639 and may provide the recovered control information to controller/processor 1640.

Controllers/processors 1640 and 1690 may direct the operation at base station 110 and UE 120, respectively. Processor 1640 and/or other processors and modules at base station 110 may perform or direct process 1000 in FIG. 10, process 1400 in FIG. 14, and/or other processes for the techniques described herein. Processor 1690 and/or other processors and modules at UE 120 may perform or direct process 1200 in FIG. 12 and/or other processes for the techniques described herein. Memories 1642 and 1692 may store data and program codes for base station 110 and UE 120, respectively. A scheduler 1644 may schedule UE 120 and/or other UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   transmitting first control information to support communication for at least one first user equipment (UE) on a first system bandwidth; and
   transmitting second control information to support communication for at least one second UE, wherein the at least one second UE communicates on a second system bandwidth comprising a bandwidth portion that overlaps the first system bandwidth and additional bandwidth, wherein the second control information is transmitted on only the first system bandwidth;
   transmitting a cell-specific reference signal (CRS) across the first system bandwidth; and
   transmitting at least one additional reference signal only on the additional bandwidth,
   wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

2. The method of claim 1, further comprising:
   transmitting data to the at least one second UE on the second system bandwidth, wherein the at least one second UE has different system bandwidths for control information and data.

3. The method of claim 1, further comprising:
   transmitting at least one control channel on the first system bandwidth, and wherein the first and second control information is transmitted on the at least one control channel.

4. The method of claim 1, further comprising:
   transmitting at least one control channel on the first system bandwidth; and
   transmitting at least one additional control channel on the additional bandwidth, wherein the first control information is transmitted on the at least one control channel.

5. The method of claim 1, further comprising:
   determining resources for a control channel, used to send acknowledgement (ACK) and negative acknowledgement (NACK) information to the first and second UEs, based on the first system bandwidth instead of the second system bandwidth.

6. The method of claim 1, wherein the first system bandwidth is partitioned into resource block groups (RBGs) of a first size, wherein the second system bandwidth is partitioned into RBGs of a second size, and wherein the second size is different from the first size or is an integer multiple of the first size.

7. The method of claim 1, further comprising:
   transmitting data to the at least one first UE with frequency hopping within the first system bandwidth; and
   transmitting data to the at least one second UE with frequency hopping within the second system bandwidth.

8. The method of claim 7, wherein the transmitting data to the at least one second UE comprises transmitting data to the at least one second UE with frequency hopping within the first system bandwidth for resources mapped to the first system bandwidth and within the additional bandwidth for resources mapped to the additional bandwidth.

9. The method of claim 1, further comprising:
   transmitting data to the at least one first UE with frequency hopping based on a first gap value that determines amount to hop for the at least one first UE; and
   transmitting data to the at least one second UE with frequency hopping based on a second gap value that determines amount to hop for the at least one second UE, wherein the second gap value is different from the first gap value or is an integer multiple of the first gap value.

10. The method of claim 1, further comprising:
    receiving first channel feedback information from the at least one first UE for first subbands defined based on the first system bandwidth; and
    receiving second channel feedback information from the at least one second UE for second subbands defined based on the second system bandwidth or for the first subbands and at least one additional subband defined based on the additional bandwidth.

11. The method of claim 1, wherein the at least one first UE communicates on the first system bandwidth for downlink and on a third system bandwidth for uplink, wherein the at least one second UE communicates on the second system bandwidth for the downlink and on a fourth system bandwidth for the uplink, and wherein the fourth system bandwidth overlaps the third system bandwidth and comprises the third system bandwidth and additional bandwidth.

12. The method of claim 11, further comprising:
receiving third control information from the at least one first UE on the third system bandwidth; and
receiving fourth control information from the at least one second UE on the third system bandwidth.

13. The method of claim 11, further comprising:
receiving data transmitted by the at least one first UE with frequency hopping within the third system bandwidth; and
receiving data transmitted by the at least one second UE with frequency hopping within the fourth system bandwidth or with frequency hopping within the third system bandwidth for resources mapped to the third system bandwidth and within the additional bandwidth for resources mapped to the additional bandwidth.

14. The method of claim 11, further comprising:
receiving at least one sounding reference signal transmitted by the at least one first UE across the third system bandwidth; and
receiving at least one other sounding reference signal transmitted by the at least one second UE across the third system bandwidth or across the fourth system bandwidth.

15. The method of claim 1, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

16. The method of claim 1, wherein the additional reference signal is a UE-specific reference signal (UE-RS).

17. The method of claim 1, wherein the additional reference signal is a channel state information reference signal (CSI-RS).

18. The method of claim 17, further comprising:
receiving a wideband CQI report for the second bandwidth from the second UE.

19. The method of claim 17, further comprising:
receiving two separate CQI reports respectively for the first bandwidth and the additional bandwidth from the second UE.

20. The method of claim 19, wherein the two separate CQI reports are encoded separately.

21. The method of claim 19, wherein the two separate CQI reports are encoded jointly.

22. An apparatus for wireless communication, comprising:
means for transmitting first control information to support communication for at least one first user equipment (UE) on a first system bandwidth;
means for transmitting second control information to support communication for at least one second UE, wherein the at least one second UE communicates on a second system bandwidth comprising a bandwidth portion that overlaps the first system bandwidth and additional bandwidth, wherein the means for transmitting the second control information comprises means for transmitting the second control information on only the first system bandwidth;
means for transmitting a cell-specific reference signal (CRS) across the first system bandwidth; and
means for transmitting at least one additional reference signal only on the additional bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

23. The apparatus of claim 22, further comprising:
means for transmitting data to the at least one first UE with frequency hopping within the first system bandwidth; and
means for transmitting data to the at least one second UE with frequency hopping within the second system bandwidth.

24. The apparatus of claim 22, wherein the at least one first UE communicates on the first system bandwidth for downlink and on a third system bandwidth for uplink, wherein the at least one second UE communicates on the second system bandwidth for the downlink and on a fourth system bandwidth for the uplink, and wherein the fourth system bandwidth overlaps the third system bandwidth and comprises the third system bandwidth and additional bandwidth.

25. The apparatus of claim 24, further comprising:
means for receiving third control information from the at least one first UE on the third system bandwidth; and
means for receiving fourth control information from the at least one second UE on the third system bandwidth.

26. The apparatus of claim 24, further comprising:
means for receiving data transmitted by the at least one first UE with frequency hopping within the third system bandwidth; and
means for receiving data transmitted by the at least one second UE with frequency hopping within the fourth system bandwidth.

27. The apparatus of claim 22, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

28. An apparatus for wireless communication, comprising:
at least one processor configured to transmit first control information to support communication for at least one first user equipment (UE) on a first system bandwidth, to transmit second control information to support communication for at least one second UE, wherein the at least one second UE communicates on a second system bandwidth comprising a bandwidth portion that overlaps the first system bandwidth and additional bandwidth, wherein the at least one processor is configured to transmit the second control information on only the first system bandwidth, to transmit a cell-specific reference signal (CRS) across the first system bandwidth, and to transmit at least one additional reference signal only on the additional bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

29. The apparatus of claim 28, wherein the at least one processor is configured to transmit data to the at least one first UE with frequency hopping within the first system bandwidth, and to transmit data to the at least one second UE with frequency hopping within the second system bandwidth.

30. The apparatus of claim 28, wherein the at least one first UE communicates on the first system bandwidth for downlink and on a third system bandwidth for uplink, wherein the at least one second UE communicates on the second system bandwidth for the downlink and on a fourth system bandwidth for the uplink, and wherein the fourth system bandwidth overlaps the third system bandwidth and comprises the third system bandwidth and additional bandwidth.

31. The apparatus of claim 30, wherein the at least one processor is configured to receive third control information from the at least one first UE on the third system bandwidth, and to receive fourth control information from the at least one second UE on the third system bandwidth.

32. The apparatus of claim 30, wherein the at least one processor is configured to receive data transmitted by the at least one first UE with frequency hopping within the third system bandwidth, and to receive data transmitted by the at least one second UE with frequency hopping within the fourth system bandwidth.

33. The apparatus of claim 28, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

34. A non-transitory computer-readable medium comprising:
code for causing at least one computer to transmit first control information to support communication for at least one first user equipment (UE) on a first system bandwidth, and
code for causing the at least one computer to transmit second control information to support communication for at least one second UE, wherein the at least one second UE communicates on a second system bandwidth comprising a bandwidth portion that overlaps the first system bandwidth and additional bandwidth, wherein the code causes the at least one computer to transmit the second control information on only the first system bandwidth;
code for causing at least one computer to transmit a cell-specific reference signal (CRS) across the first system bandwidth; and
code for causing at least one computer to transmit at least one additional reference signal only on the additional bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

35. The computer program product of claim 34, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

36. A method for wireless communication, comprising:
receiving control information from a base station at a user equipment (UE), wherein the base station transmits first control information to support communication for at least one first UE on a first system bandwidth, transmits second control information to support communication for at least one second UE on a second system bandwidth comprising a bandwidth portion that overlaps the first system bandwidth and additional bandwidth, and wherein the UE is one of the at least one second UE;
communicating with the base station based on the control information, wherein the receiving the control information comprises receiving a cell-specific reference signal (CRS) transmitted by the base station across the first system bandwidth, and receiving at least one additional reference signal transmitted by the base station only on the additional bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

37. The method of claim 36, wherein the communicating with the base station comprises receiving data from the base station on the second system bandwidth.

38. The method of claim 36, wherein the receiving control information comprises receiving acknowledgement (ACK) and negative acknowledgement (NACK) information from a control channel, and wherein resources for the control channel are determined based on the first system bandwidth instead of the second system bandwidth.

39. The method of claim 36, wherein the communicating with the base station comprises receiving data transmitted by the base station on at least one resource block, wherein the first system bandwidth is partitioned into resource block groups (RBGs) of a first size, wherein the second system bandwidth is partitioned into RBGs of a second size, wherein the second size is different from the first size or is an integer multiple of the first size, and wherein the at least one resource block is determined based on the RBGs of the second size.

40. The method of claim 36, wherein the communicating with the base station comprises receiving data transmitted by the base station with frequency hopping within the second system bandwidth.

41. The method of claim 40, wherein the receiving data transmitted by the base station comprises receiving data transmitted by the base station with frequency hopping within the first system bandwidth for resources mapped to the first system bandwidth and within the additional bandwidth for resources mapped to the additional bandwidth.

42. The method of claim 36, wherein the communicating with the base station comprises receiving data transmitted by the base station with frequency hopping, wherein the base station transmits data to the at least one first UE with frequency hopping based on a first gap value and transmits data to the at least one second UE with frequency hopping based on a second gap value, and wherein the second gap value is different from the first gap value or is an integer multiple of the first gap value.

43. The method of claim 36, further comprising:
sending channel feedback information from the UE to the base station for first subbands defined based on the first system bandwidth, or for second subbands defined based on the second system bandwidth, or for the first subbands and at least one additional subband defined based on the additional bandwidth.

44. The method of claim 43, wherein the channel feedback information comprises channel quality indicator (CQI) information, or precoding matrix indicator (PMI) information, or rank indicator (RI) information, or a combination thereof.

45. The method of claim 36, further comprising:
sending a single report comprising channel feedback information for the second system bandwidth.

46. The method of claim 36, further comprising:
sending a first report comprising channel feedback information for the first system bandwidth; and
sending a second report comprising channel feedback information for the additional bandwidth.

47. The method of claim 36, wherein the at least one first UE communicates on the first system bandwidth for downlink and on a third system bandwidth for uplink, wherein the at least one second UE communicates on the second system bandwidth for the downlink and on a fourth system bandwidth for the uplink, and wherein the fourth system bandwidth comprises the third system bandwidth and additional bandwidth.

48. The method of claim 47, further comprising:
transmitting uplink control information from the UE to the base station on the third system bandwidth.

49. The method of claim 47, further comprising:
transmitting data from the UE to the base station with frequency hopping within the fourth system bandwidth.

50. The method of claim 49, wherein the transmitting data comprises transmitting data from the UE to the base station with frequency hopping within the third system bandwidth for resources mapped to the third system bandwidth and within the additional bandwidth for resources mapped to the additional bandwidth.

51. The method of claim 47, further comprising:
transmitting a sounding reference signal from the UE to the base station across the third system bandwidth or across the fourth system bandwidth.

52. The method of claim 36, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

53. An apparatus for wireless communication, comprising:
means for receiving control information from a base station at a user equipment (UE), wherein the base station transmits first control information to support communication for at least one first UE on a first system bandwidth and transmits second control information to support communication for at least one second UE on a second system bandwidth comprising a bandwidth portion that overlaps the first system bandwidth and additional bandwidth, and wherein the UE is one of the at least one second UE;
means for communicating with the base station based on the control information, wherein the means for receiving the control information comprises means for receiving a cell-specific reference signal (CRS) transmitted by the base station across the first system bandwidth, and means for receiving at least one additional reference signal transmitted by the base station only on the additional bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

54. The apparatus of claim 53, wherein the means for communicating with the base station comprises means for receiving data from the base station on the second system bandwidth.

55. The apparatus of claim 53, wherein the at least one first UE communicates on the first system bandwidth for downlink and on a third system bandwidth for uplink, wherein the at least one second UE communicates on the second system bandwidth for the downlink and on a fourth system bandwidth for the uplink, and wherein the fourth system bandwidth comprises the third system bandwidth and additional bandwidth.

56. The apparatus of claim 55, further comprising:
means for transmitting uplink control information from the UE to the base station on the third system bandwidth.

57. The apparatus of claim 55, further comprising:
means for transmitting data from the UE to the base station with frequency hopping within the fourth system bandwidth.

58. The apparatus of claim 53, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

59. A method for wireless communication, comprising:
communicating with at least one first user equipment (UE) on a first system bandwidth in first subframes, including transmitting a cell-specific reference signal (CRS) across the first system bandwidth; and
communicating with at least one second UE on a second system bandwidth in second subframes, including transmitting at least one additional reference signal only on additional bandwidth, the second system bandwidth comprising a bandwidth portion that overlaps the first system bandwidth and the additional bandwidth, and the first subframes being time division multiplexed with the second subframes, wherein control information is communicated on only the first system bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

60. The method of claim 59, wherein the first and second system bandwidths and the first and second subframes are for downlink, the method further comprising:
communicating with the at least one first UE on a third system bandwidth in third subframes for uplink; and
communicating with the at least one second UE on a fourth system bandwidth in fourth subframes for the uplink, the fourth system bandwidth overlapping the third system bandwidth, and the third subframes being time division multiplexed with the fourth subframes.

61. The method of claim 60, wherein for each first subframe in which data transmission is sent to the at least one first UE, a third subframe is available on the uplink, after a predetermined delay, to send acknowledgement (ACK) and negative acknowledgement (NACK) information for the data transmission.

62. The method of claim 60, wherein for each first subframe in which at least one uplink grant is sent to the at least one first UE, a third subframe is available on the uplink, after a predetermined delay, for data transmission by the at least one first UE on the uplink.

63. The method of claim 60, wherein for each first subframe in which at least one uplink grant is sent to the at least one first UE, another first subframe is available on the downlink, after a predetermined delay, to send acknowledgement (ACK) and negative acknowledgement (NACK) information.

64. The method of claim 59, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

65. An apparatus for wireless communication, comprising:
means for communicating with at least one first user equipment (UE) on a first system bandwidth in first subframes, including means for transmitting a cell-specific reference signal (CRS) across the first system bandwidth; and
means for communicating with at least one second UE on a second system bandwidth in second subframes, including transmitting at least one additional reference signal only on additional bandwidth, the second system bandwidth comprising a bandwidth portion that overlaps the first system bandwidth and the additional bandwidth, and the first subframes being time division multiplexed with the second subframes, wherein control information is communicated on only the first system bandwidth,
wherein resource blocks within the first system bandwidth are assigned unique indices, resource blocks within the additional bandwidth are assigned unique indices, and a given resource block has a same index for the first system bandwidth and the bandwidth portion of the second system bandwidth that overlaps the first system bandwidth.

66. The apparatus of claim 65, wherein the first and second system bandwidths and the first and second subframes are for downlink, the apparatus further comprising:
means for communicating with the at least one first UE on a third system bandwidth in third subframes for uplink; and
means for communicating with the at least one second UE on a fourth system bandwidth in fourth subframes for the uplink, the fourth system bandwidth overlapping the third system bandwidth, and the third subframes being time division multiplexed with the fourth subframes.

67. The apparatus of claim 65, wherein at least one of physical resource blocks or virtual resource blocks within the first system bandwidth are assigned unique indices, at least one of physical resource blocks or virtual resource blocks within the additional bandwidth are assigned unique indices, and a given physical resource block or virtual resource block has a same index for the first system bandwidth and the bandwidth portion of the second system bandwidth that overlaps the first system bandwidth.

* * * * *